US006631522B1

(12) United States Patent
Erdelyi

(10) Patent No.: US 6,631,522 B1
(45) Date of Patent: Oct. 7, 2003

(54) METHOD AND SYSTEM FOR INDEXING, SORTING, AND DISPLAYING A VIDEO DATABASE

(76) Inventor: David Erdelyi, 131 Buena Vista, Stinson Beach, CA (US) 94970

( * ) Notice: Subject to any disclaimer, the term of this patent is extended or adjusted under 35 U.S.C. 154(b) by 0 days.

(21) Appl. No.: 09/009,566

(22) Filed: Jan. 20, 1998

(51) Int. Cl.$^7$ .................... H04N 5/445; G06F 17/30; G06F 7/00; G06F 13/00; G09G 5/00
(52) U.S. Cl. .................. 725/53; 345/784; 345/723; 707/1; 707/7
(58) Field of Search .................... 725/53, 52, 115, 725/133, 131, 141, 139; 348/157; 345/719, 720, 784; 707/7, 102; 463/1, 40, 43; H04N 3/00, 13/00, 5/445, 7/173; G06F 17/30, 7/00, 3/00, 13/00; G09G 5/00

(56) References Cited

U.S. PATENT DOCUMENTS

| | | | | |
|---|---|---|---|---|
| 4,977,503 A | * | 12/1990 | Rudnick et al. | 700/91 |
| 5,353,401 A | * | 10/1994 | Iizawa et al. | 345/763 |
| 5,434,678 A | | 7/1995 | Abecassis | 358/342 |
| 5,485,611 A | | 1/1996 | Astle | 395/600 |
| 5,513,854 A | * | 5/1996 | Daver | 700/91 |
| 5,544,327 A | | 8/1996 | Dan et al. | 395/250 |
| 5,600,775 A | | 2/1997 | King et al. | 395/806 |
| 5,636,920 A | * | 6/1997 | Shur et al. | 463/1 |
| 5,653,634 A | * | 8/1997 | Hodges | 463/1 |
| 5,655,117 A | | 8/1997 | Goldberg et al. | 395/613 |
| 5,729,471 A | * | 3/1998 | Jain et al. | 725/131 |
| 5,772,512 A | * | 6/1998 | Chichester | 463/40 |
| 5,832,128 A | * | 11/1998 | Suzuki | 382/246 |
| 5,861,881 A | * | 1/1999 | Freeman et al. | 725/139 |
| 5,911,138 A | * | 6/1999 | Li et al. | 707/3 |
| 5,945,987 A | * | 8/1999 | Dunn | 345/718 |
| 5,969,704 A | * | 10/1999 | Green et al. | 345/634 |
| 6,031,545 A | * | 2/2000 | Ellenby et al. | 345/632 |
| 6,032,156 A | * | 2/2000 | Marcus | 707/104 |
| 6,061,656 A | * | 5/2000 | Pace | 705/1 |
| 6,289,167 B1 | * | 9/2001 | Boetje et al. | 386/52 |
| 6,397,209 B1 | * | 5/2002 | Reed et al. | 703/3 |
| 6,441,846 B1 | * | 8/2002 | Carlbom et al. | 348/169 |

* cited by examiner

Primary Examiner—Vivek Srivastava
(74) Attorney, Agent, or Firm—Stallman & Pollock LLP

(57) ABSTRACT

A method and system is provided for indexing, sorting, and displaying a video database. Hardware and software components, and a novel encoding process are used to provide a searchable video and informational database. Each encoder and the User use specially configured graphical user interfaces to access the system. In the preferred embodiment, component clips of different videotape views of a sporting event are batch encoded and synchronized. Data which remains constant for at least a part of a game is automatically reused. A MasterPlayerId assigned to each player is used to index all video clips and information relating to that player. A rating service provides ratings of individual plays or players. The present invention includes powerful search features that permit a User to search the informational and video database according to numerous predefined and customized criteria. A novel encoding scheme permit the viewing of MPEG format video clips in a form. of slow motion. A dedicated console permits the User to view selected information using a first display screen while simultaneously displaying some or all of this information to at least one other person using a second display screen. The present invention also permits the User to select and save custom view sets of video clips, and to control the video display. The User can switch this camera view during play or can replay a clip from a different camera view.

9 Claims, 22 Drawing Sheets

METHOD AND SYSTEM FOR INDEXING, SORTING, AND DISPLAYING A VIDEO DATABASE

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

TECHNICAL FIELD

The present invention relates generally to video databases. More specifically, the present invention is directed to a method and system for providing a video database that can be sorted to produce an individualized, user-configurable video presentation.

BACKGROUND OF THE INVENTION

Film and video have long been used to document athletic performances. It is now customary for coaches and players to review films of their performances, as well as of their competitors' performances.

Films and videos of athletic events are also commonly used by scouts and recruiters to locate talented players. However, these tapes must be manually compiled and edited for review. For example, a video tape of a football game must be heavily edited if the reviewer only wishes to view the performance of an individual player.

It has not been readily possible for a scout or recruiter to search through video records of many games, such as a season, to view only the performance of a selected player or type of play. In addition, statistical information relating to the selected player must be separately provided.

It is known in the prior art to link an informational database to a video database. For example, a method for annotating full motion digital video frames is described in King, et al, Method and Apparatus for Annotating Full Motion Video and Other Indexed Data Structures, U.S. Pat. No. 5,600,775. The King process provides graphical, textual, and digital element overlays for the digital video frames. On video playback, the annotations are displayed on the originally annotated frames.

The King process is therefore directed to superimposing a graphical or textual display over the video, or appending an audio soundtrack thereto. However, the King process does not teach a method for synchronizing a plurality of video frames. Thus, it is not readily possible to immediately switch from one video tape view to a different video tape view of the same event.

Furthermore, the King process does not disclose a method or system for indexing a plurality of video frames with an informational database to permit the display on demand of video frames and data relating to any individual who appears in at least one video frame.

It would therefore be an advantage to provide a method and system for indexing an informational database to a video record. It would be a further advantage if such method and system permitted the synchronization for rapid display of multiple video tape views of an event. It would be yet another advantage if such method and system created a database that could be searched for video records and information relating to any individual who appears in a part of the video record.

SUMMARY OF THE INVENTION

The present invention provides a method and system for indexing, sorting, and displaying a video database. The preferred embodiment of the present invention is adapted for use in indexing the video display of one or more sporting events, such as a season of league football games. However, it is readily apparent that the method and system according to the present invention can also be used to index, sort, and display video recordings of other types of events, including but not limited to theatrical performances, musical events, or political speeches.

The present invention includes hardware and software components, and implements a novel encoding process to provide a searchable video and informational database. The present invention can be implemented using any suitable computer system, including one or more personal computers, a "dumb" terminal, a network of interconnected computers, a personal digital assistant, an intranet system, or the Internet. In addition, the present invention uses at least one database to store the video database, as well as any other information to be indexed thereto. In the preferred embodiment of the present invention, five encoding levels are used to enter data into at least one searchable computer database. An intelligent scene detection process can also be used to automate any or all of the encoding processes. Each encoder and the User use specially configured graphical user interfaces (GUI s) to access the system.

Each level has its own designated security-encoding status. Thus, each level can be accessed only by entering the correct LogIn name and Password. The present invention implements security and administration protocols to provide remote and secure access to the database by encoders, Users, as well as by technical support and system maintenance personnel.

In a first encoding level, the component clips of a videotape are determined and named using a file naming protocol. This information is then batch encoded and stored to one or more system databases.

In a second encoding level, all play information is indexed. Jersey numbers for the players in each video clip are entered into the database in the third encoding level. In alternative embodiments, other information such as identifying symbols can also be entered into the database in the third encoding level. The third encoder also assigns a MasterPlayerId to each player in the database. This MasterPlayerId is used to index all video clips and information relating to that player.

In the fourth encoding level, the clips and the individual players are evaluated and assigned a rating, which is also entered into the database. The present invention includes an optional rating service which can provide ratings of individual plays or players. This service can be distributed as an on-demand service, or can be distributed as part of a database that can be updated, as desired by the User.

Database updates, and any other statistics or information are entered into the database in the fifth encoding level. The present invention uses a SuperFill process to automatically reuse data which will remain constant for a group of clips, or for all clips in a game. A User can then access the database and display selected information and clips from the database.

In the preferred embodiment of the present invention, the End-User GUI is adapted for display on a dedicated console that permits the User to view selected information using a first display screen while simultaneously displaying some or all of this information to at least one other person using a second display screen. The first display screen displays the statistics, video, and complete features of the User GUI. The second display screen is preferably a rotatable audience display screen that displays only the video clip display.

The present invention includes powerful "intelligent" search features that permit a User to search the database according to numerous predefined and customized criteria. For example, The User can use the End-User GUI of the present invention to search the database for information and video clips selected according to searchable criteria. Such criteria include, but are not limited to, player name, a particular game or games, type of play, play rating, and contract status. Information about a selected player such as statistics, activity, and injury reports can also be displayed. In addition, the User can view and sum any combination of game play statistics.

The End-User GUI includes displays for such features as a player search, player statistics, player information, View Time Control, and video screen box. The User can configure the appearance of the End-User interface using a User Preferences GUI. The present invention also permits the User to select and save custom view sets of video clips, and to control the video display by selecting the number of video clips, and the total viewing time.

The present invention includes a play loop function that permits the User to automatically return to the beginning of a selected video clip. The present invention also permits the User to select the order of play for the clips and to select the camera view displayed. The User can switch this camera view during play or can replay a clip from a different camera view. The present invention includes a view selection feature that displays a video clip from a view that is determined by such factors as the position of a selected player, or the type of play.

The present invention also provides an isolation play mode in which the User will view only a selected portion of a video clip. Furthermore, the present invention uses a novel encoding scheme to permit the viewing of MPEG format video clips in a form of slow motion.

DETAILED DESCRIPTION OF THE INVENTION

The present invention provides a method and system for indexing, sorting, and displaying a video database. The preferred embodiment of the present invention is adapted for use in indexing the video display of one or more sporting events, such as a season of league football games. However, it is readily apparent that the method and system according to the present invention can also be used to index, sort, and display video recordings of other types of events, including but not limited to theatrical performances, musical events, or political speeches.

The present invention is described herein with respect to the sport of football. Thus, the examples provided describe a method and system for indexing a video display of any or all of the games of at least one season in a football league. However, this description is provided for purposes of example only, and is not intended in any way as a limitation upon the scope of the present invention.

The invention uses at least one database structure to store the video database, as well as any other information to be indexed thereto. The term "database" is used in this application to refer to the database structure and any database located therein. The term "database" is used for exemplary purposes only, and is not meant to limit the present invention to the use of one database. One skilled in the art will appreciate that any number of databases can be used to store the video clips and information used in the present invention.

The term "User" in the present application refers to an End-User of the invention. The term "user" in the present application refers to any person who uses the invention, including but not limited to an encoder, End-User, programmer, or technical support personnel.

Figure 1:
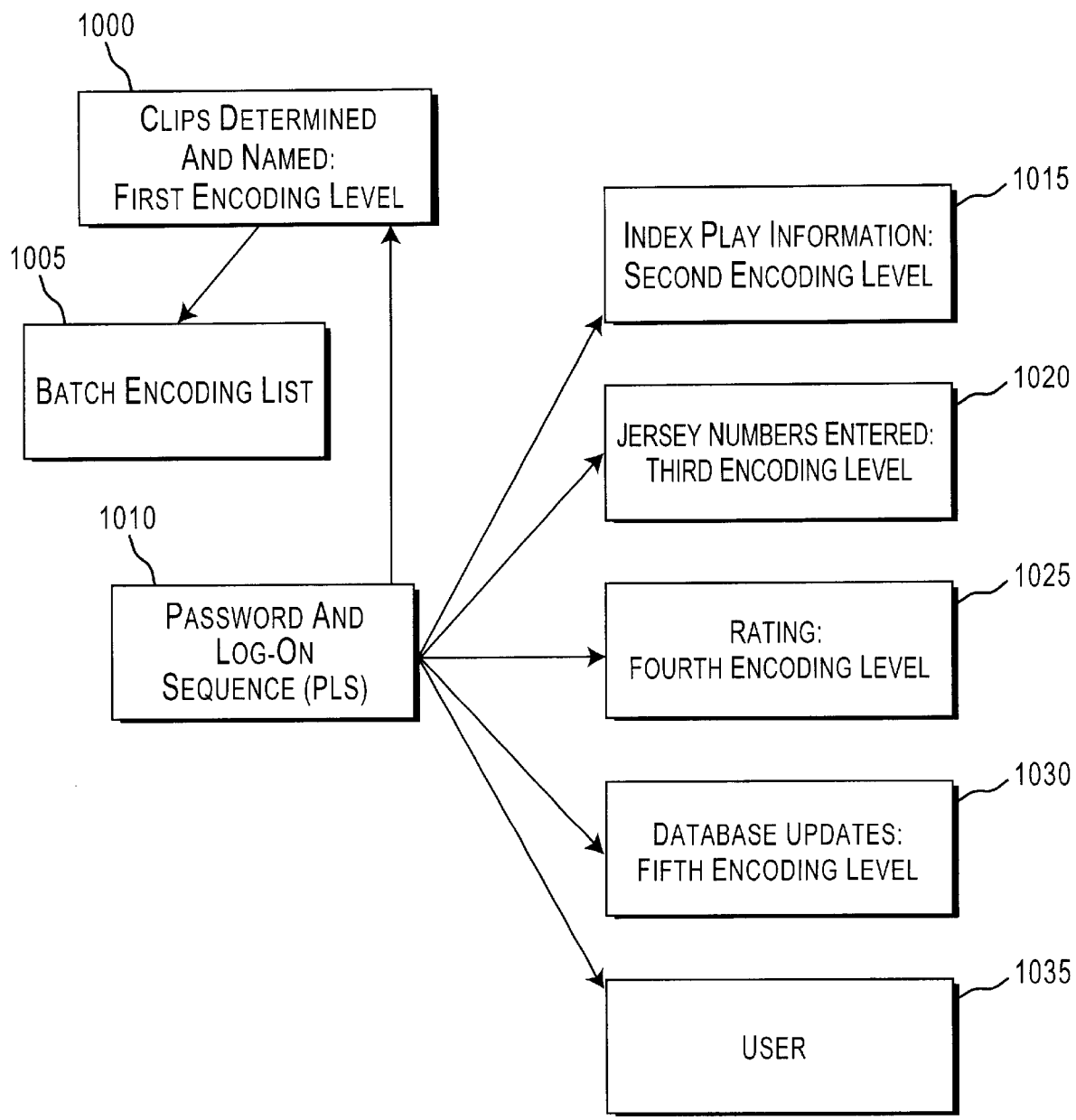
FIG. 1 is a master flow chart of the method and system for indexing a video database according to the present invention.

FIG. 1 is a master flow chart of the method and system for indexing a video database according to the present invention. In the preferred embodiment of the present invention, five encoding levels are used to enter data into at least one searchable computer database structure. However, one skilled in the art will recognize that the number of encoding levels, and the specific data to be entered at each level, are readily modified according to the particular process requirements.

The present invention can be implemented using any suitable computer system, including one or more personal computers, a "dumb" terminal, a network of interconnected computers, a personal digital assistant, a satellite communications system, an intranet system, the Internet or any other suitable means of digital communication. Furthermore, each level of the present invention can be accessed using a different type of terminal or computer. For example, the first encoding level can be performed using a personal computer, while the User can access and view the information using a "dumb" terminal connected to the invention databases through the Internet.

In the first encoding level, the discrete component clips of a video record, such as a videotape, are determined and named using a file naming protocol (1000). This information is stored in an identification database as a BatchEncoding List (1005). All encoding levels, as well as the end-user level, are accessible through a password and LogOn Sequence (1010). The password and LogOn Sequence is described in more detail with regard to FIG. 2. Each of these levels can only be accessed by the appropriate encoder or user.

In the second encoding level, all play information is indexed (1015). Player jersey numbers for the players in each video clip are entered into the database in the third encoding level (1020). In the fourth encoding level, the clips and the individual players are evaluated and assigned a rating (1025). This rating is then entered into the database. Database updates, and any other statistics or information are entered into the database in the fifth encoding level (1030). The End-User (User) can then access the database and display selected information and clips from the database (1035).

The encoders and the User use graphical user interfaces (GUI s) to access the system. Each GUI is specifically configured for the appropriate level. For example, an encoder GUI includes fields for the entry of data into the database, while the End-User GUI contains fields that permit the User to search the database for selected information. These GUI s are described below with respect to the individual encoding and User levels.

In the preferred embodiment of the present invention, the End-User GUI (described below in more detail with respect to FIG. 4) is adapted for display on a dedicated console. An example of such console is shown in Appendix "A," attached hereto and incorporated as a part hereof. The console can be configured as a kiosk, if desired.

The console permits the User to view selected information using a first display screen while simultaneously displaying some or all of this information to at least one other person using a second display screen. For example, the dedicated console can include a User Display screen that displays the End-User GUI to the User only. This User display screen can be any type of display, such as a liquid crystal display (LCD), portable display, projection display, standard NTSC display, or high definition television display.

A rotatable audience display screen that only displays the video clip display can also be provided. This second display screen is used for presentations in which it is not desirable for the viewers to see or access the statistics, video, and complete features of the User GUI.

In alternative embodiments of the present invention, the selected information is displayed on any appropriate video display, such as a television, video monitor, or liquid crystal display.

Figure 2:
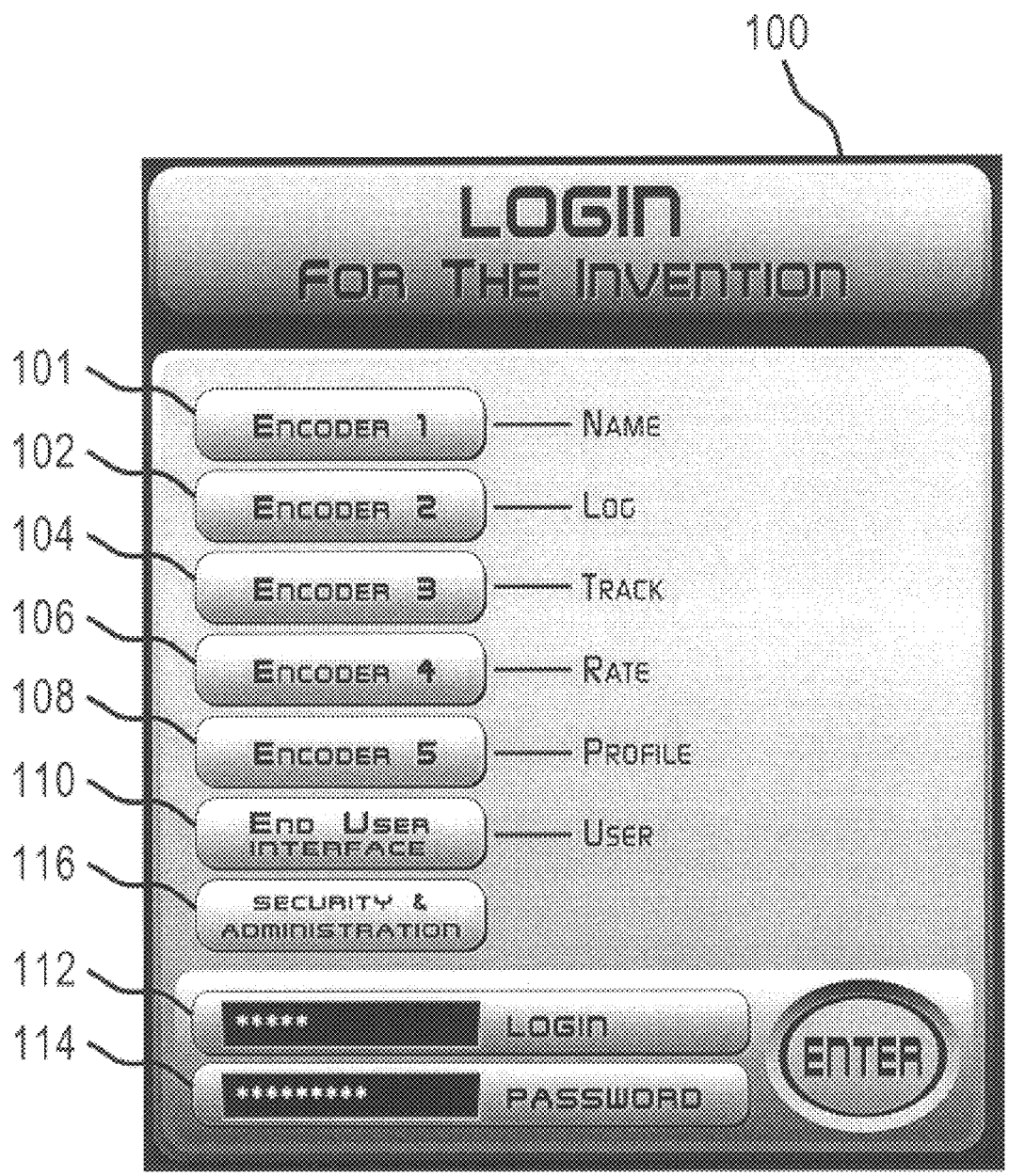
FIG. 2 is a screen display of a password and LogOn Sequence GUI according to the present invention.

FIG. 2 is a screen display of a password and LogOn Sequence GUI 100 according to the present invention. To log on to the system of the present invention, a user first selects the desired path. In the preferred embodiment of the present invention, the path is selected by clicking a button. However, the path can be selected using any other appropriate means, including a check box, command button, keyboard entry, drop-down list box, list box, slider text box, touch-sensitive screen, or voice recognition.

Thus, the first encoder selects the Name path 101, the second encoder selects the Log path 102, the third encoder selects the Track path, the fourth encoder selects the Rate path 106, the fifth encoder selects the Profile path 108, and the end-user selects the User path 110.

Each level has its own designated security-encoding status. Therefore, each level can be accessed only by entering the correct LogIn name 112 and Password 114 for the particular path selected. If the correct LogIn name and Password have been entered, the system will open the selected application(s). The security and administration architecture 116 of the present invention will be discussed in detail with respect to FIG. 17.

Figure 3:
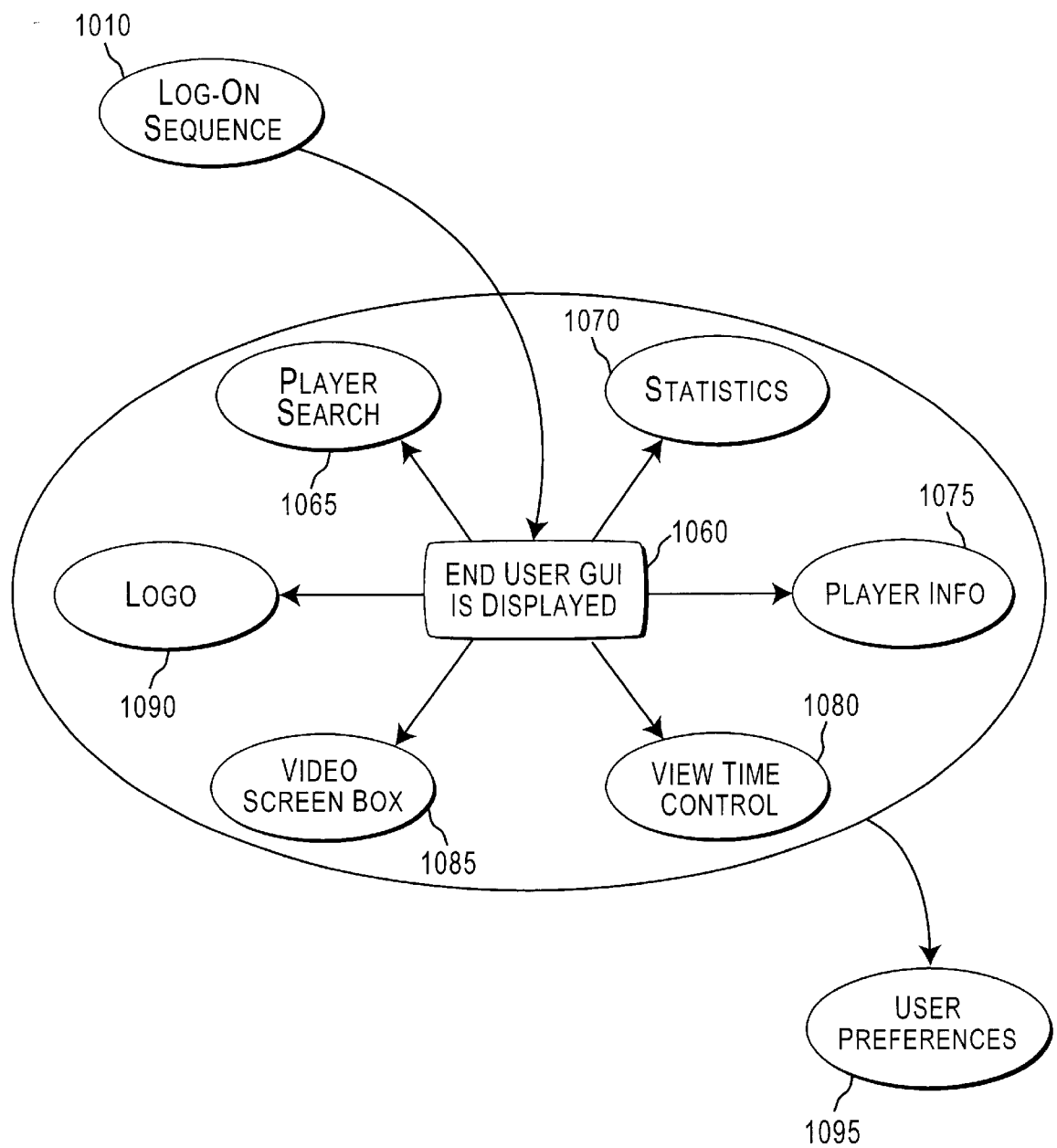
FIG. 3 is a flow chart of an end-user application process according to the present invention.

FIG. 3 is a flow chart of an end-user application process according to the present invention. The User accesses the invention by entering the information during the LogOn Sequence (1010). The End-User GUI is displayed in response to the correct entry of this security information (1060). Different User access levels can be provided and secured with password or other appropriate security protocols.

In the preferred embodiment of the present invention, the End-User GUI includes displays for such features as a player search (1065), player statistics (Statistics) (1070), player information (1075), View Time Control (VTC) (1080), and video screen box (1085). The User can configure these features using a User Preferences GUI (1095). The End-User GUI, as well as any GUI of the present invention, can optionally display a logo or advertisement (1090). Such logo or advertisement can include, but is not limited to, any of a graphical display, animation, video, audio display, or text display.

Figure 4A:
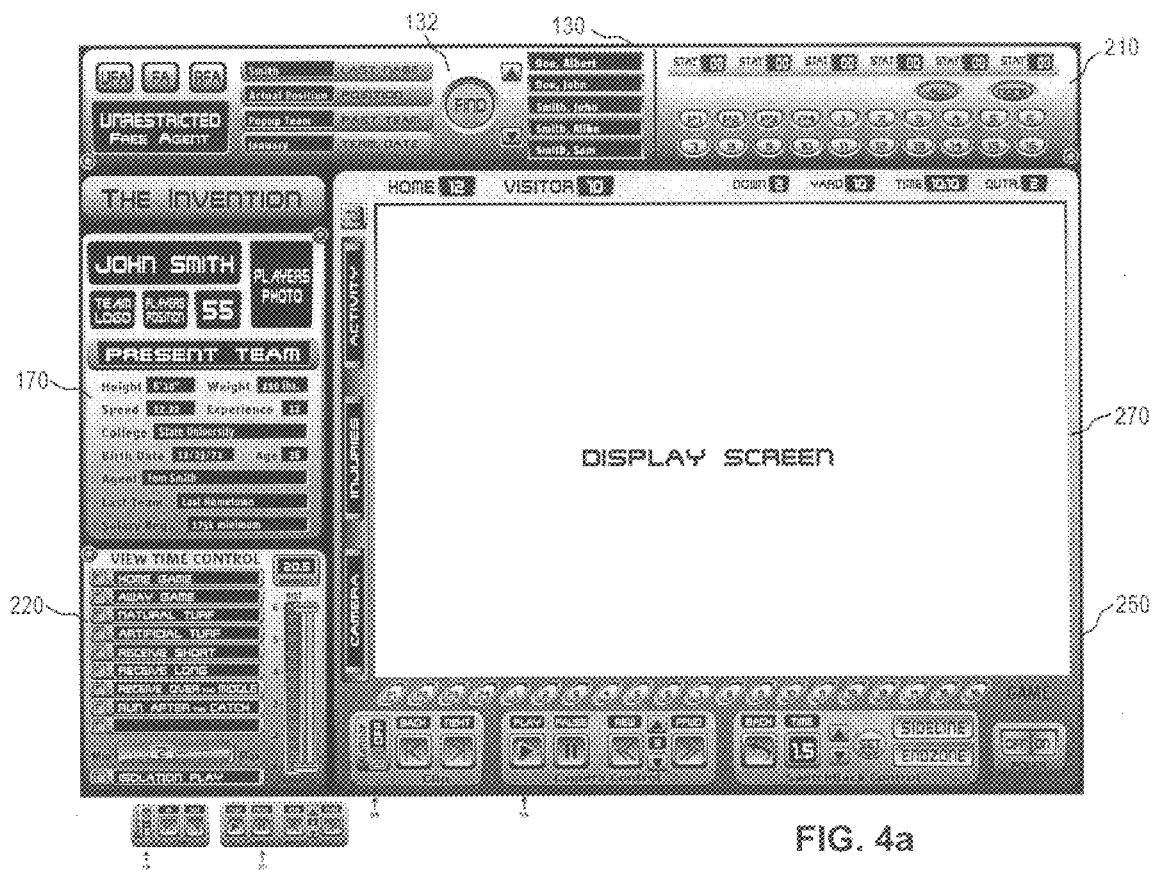
FIG. 4a is a screen display of an end user display according to the preferred embodiment of the present invention.

FIG. 4a is a screen display of an end-user display 130 according to the preferred embodiment of the present invention. The end-user display includes a selection box 132 that permits the User to search the database for information and video clips selected according to searchable criteria. Information about a selected player is displayed in a Player Information Box 170. The selected video clips, and selected player activity and injury reports are displayed in a viewing screen 270 in the Video Screen Box 250.

In the preferred embodiment of the present invention, the End-User GUI also includes a Statistics box 210 that permits the User to locate clips from any particular game, combination of games, or all games. The User can select the total number of minutes of video clip footage which the User desires to view in the View Time Control box 220.

Figure 4B:
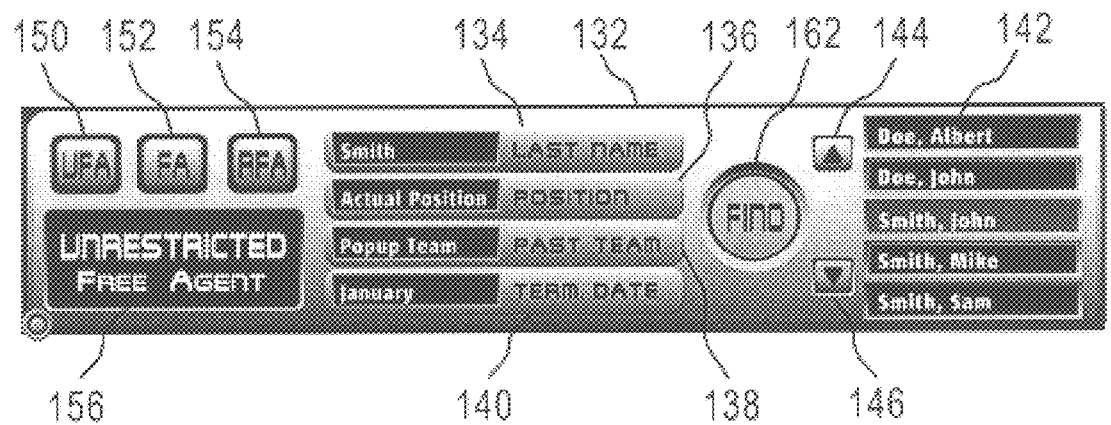
FIG. 4b is a screen display of a selection box according to the preferred embodiment of the present invention.

FIG. 4b is a screen display of a selection box 132 according to the preferred embodiment of the present invention. The play lists of clips to be viewed are generated using the Clip ID numbers of selected clips. In the preferred embodiment of the present invention, the User clicks the appropriate button to select criteria for the search.

Such criteria can include, but are not limited to, a player's name 134, position 136, and past team 138. The User can also sort the database to search for video clips for viewing according to the status of a player. For example, in the preferred embodiment of the present invention, the User can select among status categories including Unrestricted Free Agent (UFA) 150, Free Agent (FA) 152, or Restricted Free Agent (RFA) 154 players. The selected status is indicated in a status display 156.

If the Free Agent status has previously been selected, the User can also narrow the search using the player's contract termination date 140. The Find button 162 is then clicked to initiate a search.

A scrollable list 142 of players' names can be generated using these search features. The name of the player who is the closest match to the search criteria is indicated by such means as highlighting 160, centering the name display, using different fonts, and changing the font size of the player's name display. In the preferred embodiment of the present invention, the players' names list can be scrolled up 144 or down 146 by the User.

The User can also locate in the database a particular player's information without providing any search information. In such case, after clicking the Find button, the User is provided with a scrollable list displaying the names of all players whose information is stored in the database. The User can then scroll through the list to select a player. A new search can be initiated at any time by altering the search criteria and clicking the Find button.

Figure 4C:
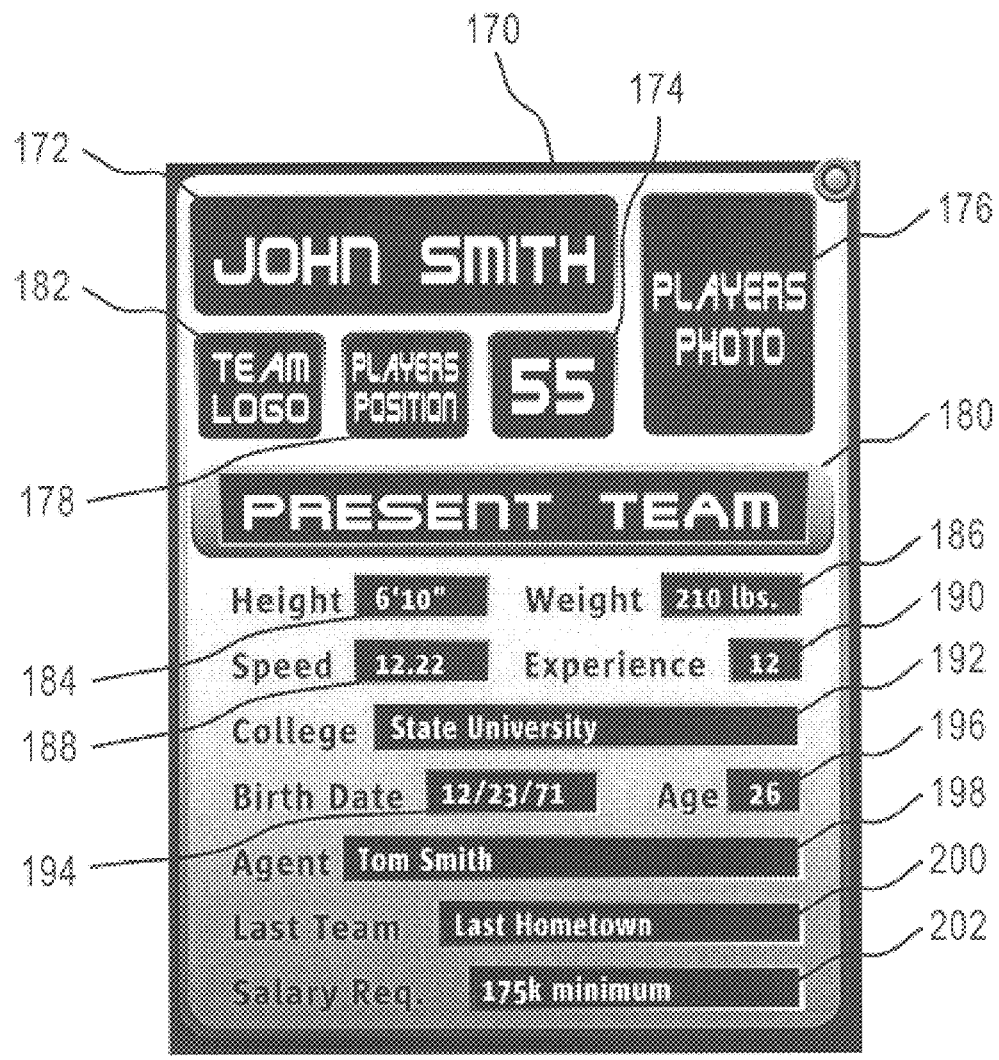
FIG. 4c is a screen display of a Player Information Box according to the preferred embodiment of the present invention.

The User clicks on the name of a player in the scrollable list to display that player's information in the Player Information Box 170, shown in FIG. 4c. In response to the selection of a particular player, the Player Information Box displays the player's profile information. Such information can include the player's:

| | |
|---|---|
| name; | 172 |
| photo; | 176 |
| jersey number; | 174 |
| position; | 176 |
| present team; | 180 |
| present team's logo; | 182 |
| height; | 184 |
| weight; | 186 |
| speed; | 188 |
| experience; | 190 |
| college; | 192 |
| date of birth; | 194 |
| age; | 196 |
| agent; | 198 |
| last team; | 200 and |
| salary requirements. | 202 |

Figure 4D:
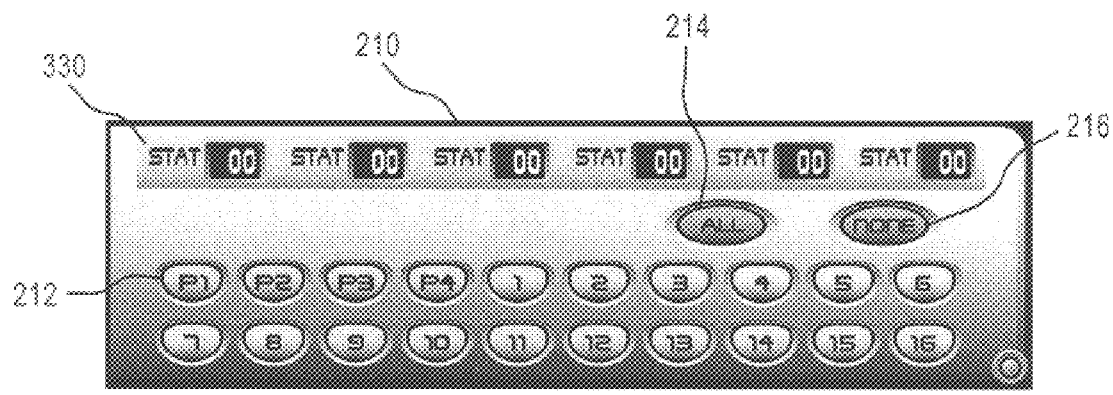
FIG. 4d is a screen display of a Statistics box according to the preferred embodiment of the present invention.

FIG. 4d is a screen display of a Statistics box according to the preferred embodiment of the present invention. The Statistics box includes selectable buttons 212 representing each game in a pre-season and season. The User can click on any of these buttons to locate clips from any particular game, combination of games, or all games. In the preferred embodiment, the buttons representing any games for which video clips, in which the selected player appears, are stored in the database are automatically displayed upon selection of the player.

In response to the selection of a particular player, the Statistics box indicates the number of games in which the player has played during the selected season. In the preferred embodiment of the present invention, the number of games is indicated by lighting up the button 212 for each game played. However, different indicators can be used in alternative embodiments of the present invention.

The Statistics box also displays the selected player's statistics. These statistics are summed up and displayed in the statistical range analyzer bar 330. The specific statistics displayed in the statistical range analyzer bar differ according to the field position played by the selected player.

The User can optionally view statistics on a game-by-game basis, and can add or subtract these statistics from the season total. If the "all" button 214 is clicked, statistics for all games in which the player has participated for that season are displayed. Alternatively, the User can select the "none" button 216, which clears all statistics from the Statistics box. The User can then view and sum any combination of game play statistics.

Figure 4E:
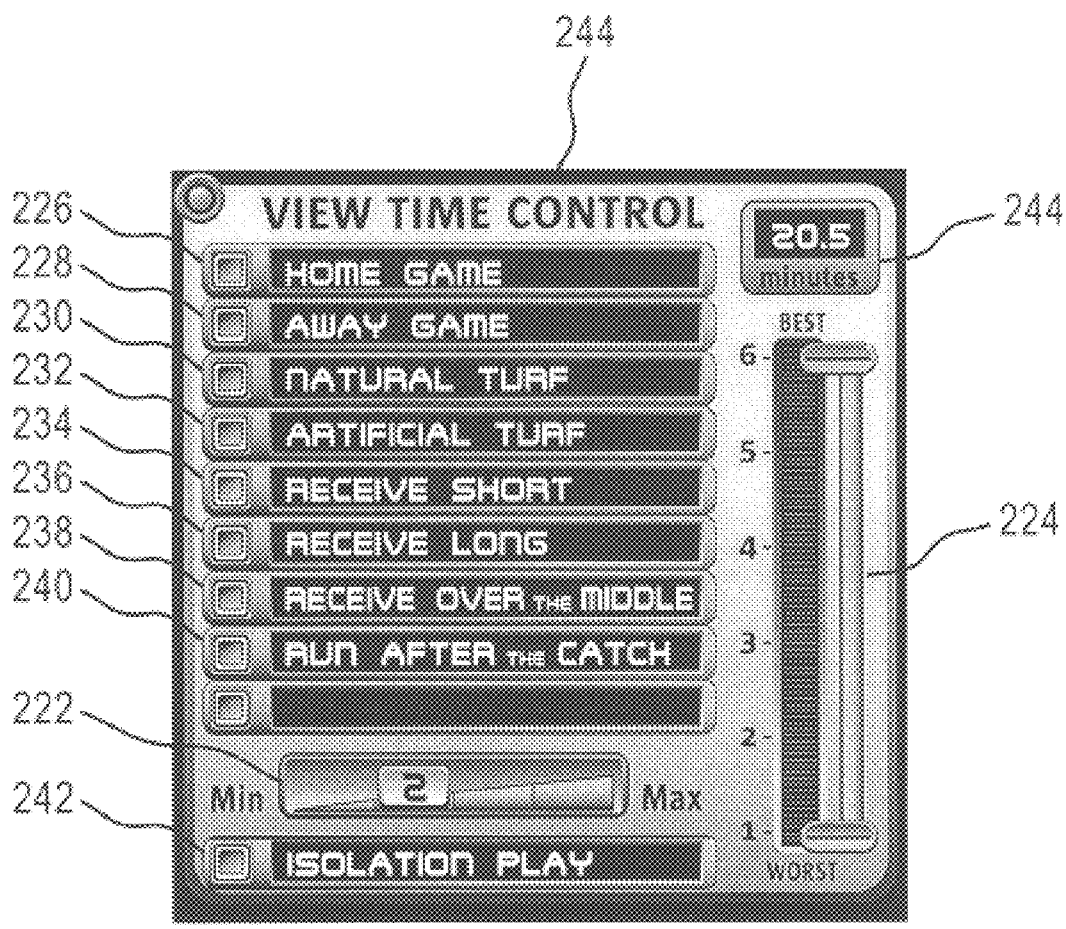
FIG. 4e is a screen display of a View Time Control box according to the preferred embodiment of the present invention.
Figure 4F:
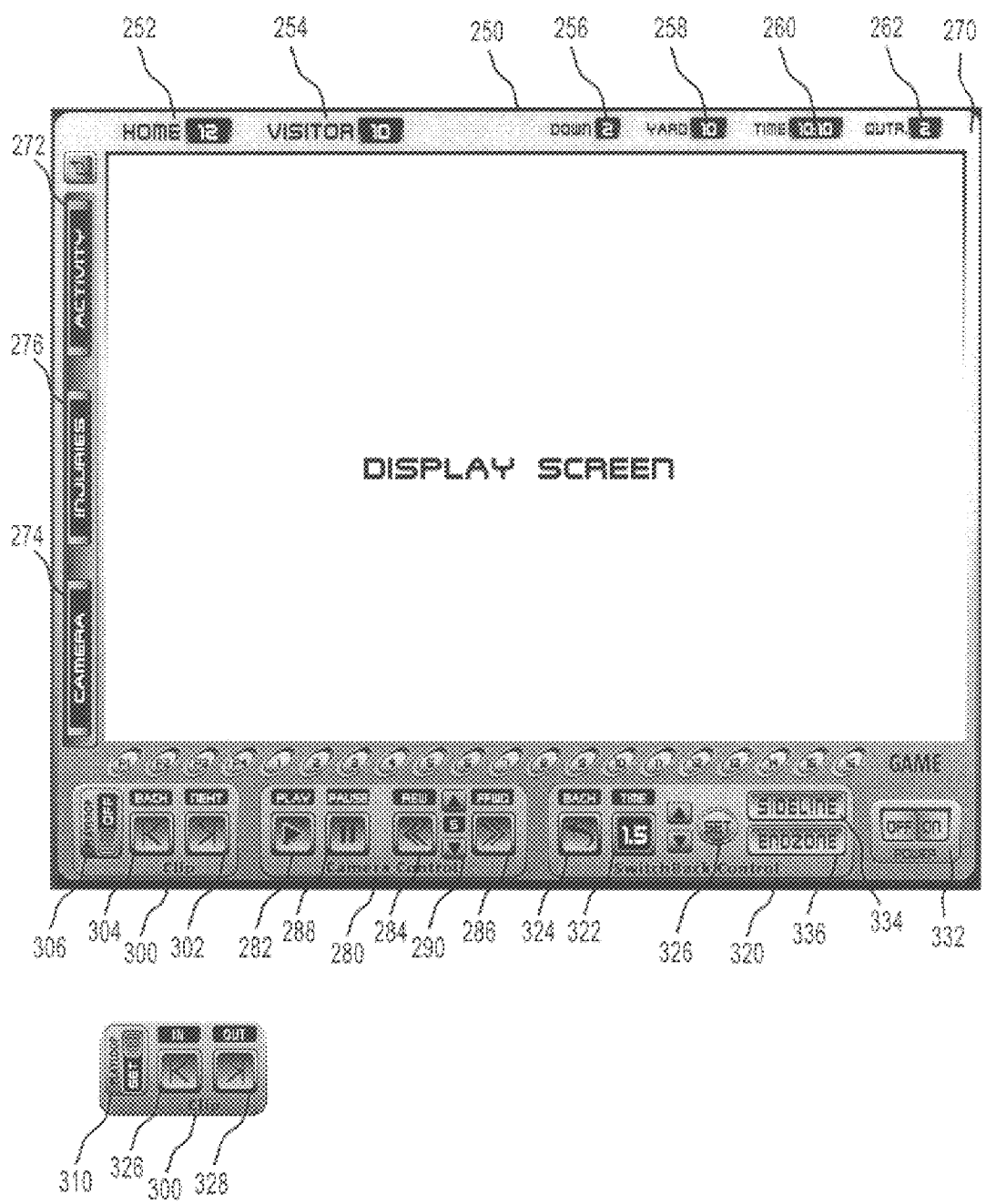
FIG. 4f is a screen display of a Video Screen Box according to the preferred embodiment of the present invention.

FIG. 4e is a screen display of a View Time Control box according to the preferred embodiment of the present invention. The View Time Control incorporates features used to formulate and direct queries to the database and to return data in response thereto.

In the View Time Control (VTC) box 220, the User can select the total number of minutes of video clip footage which the User desires to view. In the preferred embodiment of the present invention, a slider 222 having settings from Minimum to Maximum is used to select the number of minutes. However, any alternative selection means can be used, such as a text box. The total number of minutes selected can then be displayed 244.

A quality selector 224 can be provided to permit a User to select the quality of plays to display. This quality selector functions together with the slider 222 to permit the User to select both the total viewing time, and the quality of the viewed plays. User preferences can also be provided to permit the User to specify, for example, the type of play, the success of play, yardage, significance of play, conference versus non-conference plays, or a random assortment of plays to display. The User preferences are described below with respect to FIG. 5.

The VTC box also permits the User to specify other search elements. For example, the quality selector slider 224 can be adjusted by the User to display plays in any selected range between best and worst plays. In the preferred embodiment, mandatory search selections such as Home Game 226, Away Game 228, Natural Turf 230, and Artificial Turf 232 are preselected, but can be deselected by the User. The other selection criteria displayed in the VTC box are dependent upon the player's position. Such criteria can include Receive Short 234, Receive Long 236, Receive Over Middle 238 and Run After the Catch 240.

An Isolation Play 242 button can also be provided in the VTC box. The User clicks on the Isolation Play button to toggle the isolation mode on and off. In the isolation mode, the User will view only that portion of each video clip that has been marked with Isolation Play "In" and "Out" points. The Isolation Play feature will be described in more detail with respect to FIG. 13.

In the preferred embodiment of the present invention, the Video Screen Box 250 displays the scores for the Home 252 and Visitor 254 teams for each clip currently being played. The Video Screen Box also can display the down 256, yardage 258, time 260, and quarter of play 262 for the current clip.

The User can click the appropriate week number button 264 to select a game to be viewed according to the game's week number in a selected season. The button representing the selected week can then be highlighted to indicate this selection.

The End-User GUI is readily configurable. A reversal button 266 permits the User to toggle between different screen views. For example, the User can position the viewing screen 270 at either the left or the right of the GUI and toggle between these two different views.

Activity, Camera, and Injury buttons 272, 274, 276 are provided in the Video Screen Box 250 to allow the User to select among the types of displays to be shown in the viewing screen. In the preferred embodiment, the Activity Screen (not shown) is the default screen display. The Activity screen displays the selected player's Activity Report. The Injury Screen (not shown) displays the selected player's injury history. The Activity and Injury Screens can also be configured to initially display selected information. For example, the Activity Screen can be configured to initially display the player's most recent activity, or the Injury Screen can be configured to display all information relating to a player knee injuries.

When the Camera Screen (not shown) is displayed, the first video clip for the selected player is loaded, in a paused state, into the Video Screen Box for playing. The Camera Control box 280 contains standard video clip playback 282, Rewind 284, Forward 286, and pause 288 controls.

The Rewind and Forward buttons have different functionalities in the Pause and Play modes. In the Pause mode, the User clicks the Rewind or Play buttons to jump backward or forward, respectively, in the currently loaded video clip. The length of this jump is selected using the frame selection box 290.

In the Play mode, the Rewind and Play buttons are used to control the video clip at a frame decrement or increment rate, respectively, determined by the frame selection. In the preferred embodiment of the present invention, the video clips are stored in the Motion Picture Expert's Group (MPEG-2) format. The MPEG format is a highly compressible video stream that provides maximizes image quality while reducing the required bandwidth.

MPEG-2technology does not currently support frame-scrolling. The MPEG format is not frame-accurate. A frame known as the I-frame is used to synchronize the sequential frames following thereafter.

The MPEG format does not readily permit slow motion viewing because the slow motion cannot be started at any selected frame. Furthermore, it is not readily possible to go back one frame from a displayed frame. Rather, the video must return back to the previous I-frame to recalculate the sequential display of all the subsequent frames.

Thus, slow motion viewing of MPEG-2 format video clips is not readily implemented. The invention solves this problem by using a variable back-frame shuttle technology to control the video clip at a frame decrement or increment rate. This permits the User to view the video clip in a form of slow motion, for example by incrementing the video clip displayed by two clips at a selected rate.

The Pause button flashes until the User clicks the button to play the video clip. Clicking the Play button while a video clip is playing pauses the clip.

The User can select the next consecutive video clip 302 or return to the beginning of the current clip 304 using the appropriate Clip Control 300 buttons. Double-clicking on the Back Button at the beginning of a clip returns the User to the previous clip.

In the preferred embodiment of the present invention, when the User clicks the Play Loop Set switch 306 in the Clip Control box, the Play Loop label is illuminated (not shown) and the Set display 310 begins to flash. In the Play Loop mode, a clip loops continuously between the start and the end of the clip, as determined by previously encoded In and Out points. (See discussion of FIG. 6.)

The User can set customized In and Out points using the Play Loop In and Out buttons 326, 328 that are displayed in the Play Loop mode. A new loop sequence can thereby be created. If a new Play Loop In point is selected but no Play Loop Out point, then the end of the clip is the default Out point. Conversely, the beginning of the clip is the default In point when the Play Loop Out point only has been selected.

The User can turn off the looping function by clicking again on the Play Loop Set switch. The switch is thereby moved to the off position, and the looping play is terminated.

In one embodiment of the present invention, a clip button (not shown) can be provided to permit the User to define a custom view set. The clip button is clicked to display a custom view dialog. An example of a custom view set dialog is illustrated in "B" attached hereto and incorporated as a part hereof. This custom view dialog can prompt the User as to whether the User wishes to define a custom view set.

If the User elects to define a custom view set, a current view set of the currently-selected search parameters is displayed. The User can then select individual plays from this current view set. Selected plays can include fumbles, interceptions, touchdowns, or can be based on encoder or User-defined, or other criteria. The custom view set feature can also include a search mechanism to permit the User to search for clips by such criteria as, for example, down, score, or time.

Plays from more than one current view sets can be saved to the same file to provide a current view set, for example, of fumbles, best plays of the week, or of any other User-defined parameters. Such custom view sets can be saved to the database. The User can then search for stored custom view sets for later display.

Stored clips can also be marked as a custom view set, thereby creating custom reviews or presentations. A custom view set can also include personal notes from the end-user, such as comments about a play.

The VTC settings reflect the most current data available to the system. Any changes or additional data which affect a previously-defined custom view set can be accommodated by automatically updating the custom view set. Alternatively, the original custom view set can be provided with. A dialog box can then be generated to query the User whether the User wishes to update the custom view set. In the preferred embodiment of the present invention, custom view set parameters supersede the settings of the View Time Control.

The User can optionally select the order of screen display in the User Preferences. The User Preferences will be described in more detail with respect to FIG. 5. In the preferred embodiment of the present invention, the User designates, in the User Preferences GUI, the order of play for the clips. For example, the User can view clips in chronological or reverse chronological order, by rating number, or by other viewing criteria. In the absence of such selection, a default clip, such as the first clip of the game played four weeks earlier, is selected for playing.

The Switchback Control 320 permits the User to toggle between camera views, such as a sideline view 334 or an endzone 336 view, thereby permitting alternate angle replay.

An embedded snap point is used to synchronize the clips. The snap point will be described in detail with respect to FIG. 11.

The time increment selector 322 allows the User to specify the number of seconds that the clip will be rewound before the angle is switched. This feature accommodates the individual User's speed in toggling the view. The User can click on the Back button 324 to view an instant replay of the video clip, without toggling the view. The User clicks on the Set button 326 to display, the User preferences interface in the video screen box. (See FIG. 5).

The User can therefore view a video clip from, for example, a sideline view, and replay the clip from the endzone view. Alternatively, the invention is readily configured to provide a default view. This default view can be determined in response to a selected player's position. Thus, upon the selection of an offensive tackle, the default view displayed is the endzone view. The User can instantly switch the angle of view during the playing of the video clip, or during the rewinding or forwarding of the clip.

In the preferred embodiment of the present invention, a Power On Button 332 is highlighted while the system interface is in use. The User clicks on the Power Button Off to display a dialog box (not shown) containing an inquiry for verifying whether the User wishes to exit from the system program.

Figure 5:
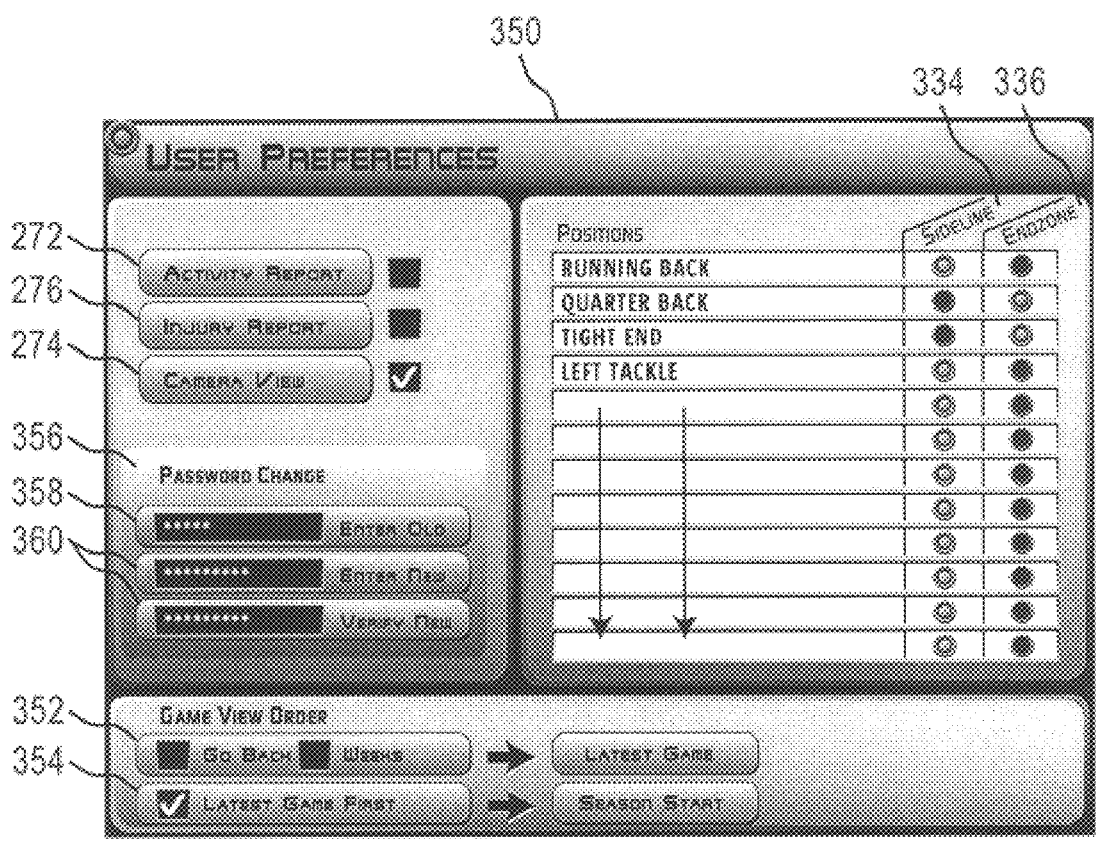
FIG. 5 is a screen display of a User Preferences GUI according to the present invention.

The User can set customized preferences for player search criteria, and for viewing the clips returned from a search. FIG. 5 is a screen display of a User Preferences GUI 350 according to the present invention. This GUI is displayed in the video screen box when the User clicks on the Set button, as previously described.

The User can select, review, and edit some or all user preferences using the User Preferences GUI. For example, the User can designate the playing order of the clips, the number of games to be searched 352, whether the footage is to be delivered in chronological or reverse chronological order 354, change a password, select the first screen view, and choose the default camera angle.

The password change preference 356 allows the User to change the User's password. In the preferred embodiment of the present invention, the User changes this password by entering the old password 358 and then entering the new password twice 360, for confirmation.

The first screen view preference is used to select whether the Activity Screen 272, Camera View Screen 274, or Injury Report Screen 276 is displayed first, upon the initiation of a search.

The User can also select the default camera angle and can set specific camera angles for viewing specific player positions. For example, the User may prefer viewing all video clips of offensive tackles from a sideline angle view 334, while viewing all video clips of the place kicker from the endzone 336.

In the preferred embodiment of the present invention, five encoding levels are used to enter data into at least one searchable computer database. The encoding of these five levels can be performed by one or more encoders. In the preferred embodiment, each encoding level is performed by a separate encoder. Alternatively, any or all of the encoder processes can be automatically implemented, for example, using a computer.

Figure 6:
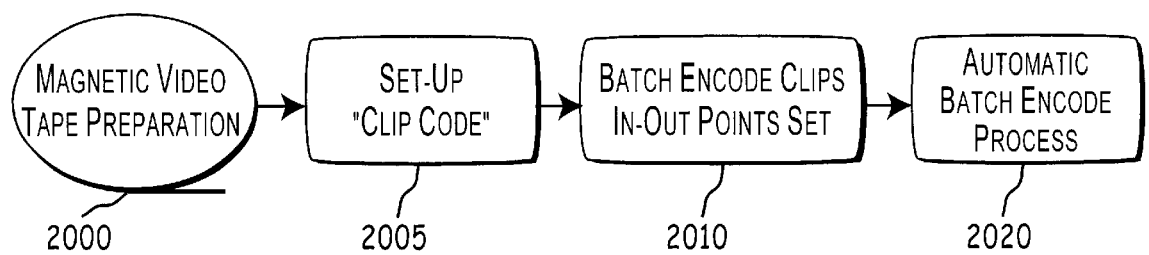
FIG. 6 is a flow chart of a first encoding process according to the present invention.

FIG. 6 is a flow chart of a first encoding process according to the present invention. In the first encoding process, the first encoder initially prepares a magnetic video tape for encoding (2000). While magnetic video tape is used in the presently preferred embodiment of the invention, the invention is also readily adapted for use with any appropriate type of storage medium, such as film.

To prepare the magnetic tape for processing, the first encoder separates from the other tracks on the videotape the tape track that records one of the camera angles of a parallel-processed game videotape. This separated tape track is then inserted into a video playing and editing machine, such as a Betacam, manufactured by Sony Electronics Inc. of Fort Myers, Fla. and controlled by the Videomedia—Local Area Network (V-LAN) manufactured by Videomedia Inc of San Jose, Calif.

Each tape track is then divided into a series of consecutive clips. A clip is a tape segment of a predetermined event. For example, each play of a football game videotape can be designated as a separate clip. A file naming protocol known as Clip ID is used to index each clip in the video database (2005).

Consistent beginning and ending points, hereinafter referred to as "In" and "Out" points, respectively, are then determined for each named clip (2010) of each separate track of the video tape. Therefore, clips of the identical play but from different camera angle tapes can be synchronized.

A software application is next used to generate a BatchEncodingList (hereafter referred to as Encoders Control List or ECL) from the separated video track (2015). In this batch encoding process, the ECL file is used to encode all specified In and Out points of each video clip into an MPEG-2 video stream format file. One suitable batch encoding software application is MPEG Works by FutureTel Inc of Sunnyvale, Calif. An ECL is generated for each camera angle stored on a videotape. For example, a videotape of a football game can include tracks that store sideline, endzone, and overhead cameras. The clips are preferably batch-encoded to an MPEG-2 format. However, any alternative video format that can be indexed, stored, and displayed according to the teachings of the present invention can also be used.

While the batch encoding process according to the preferred embodiment of the present invention is performed manually by an encoder, the process can also be automatically performed, for example, using computer control.

Each encoded videotape has its own unique ECL. Corrections, such as gamma, color, brightness, saturation hue, and compression ration can be saved to the ECL for subsequent use during display of the associated clip.

In one embodiment of the invention, each the video clips of each different view of a play can be separately and simultaneously encoded. For example, each encoder can manually pause the frame of a displayed clip at a particular point, such as a scoreboard view occurring prior to the In point of the clip. The GSSD can then be entered. Data entry differences between the different views can be detected, and errors corrected.

Figure 7:
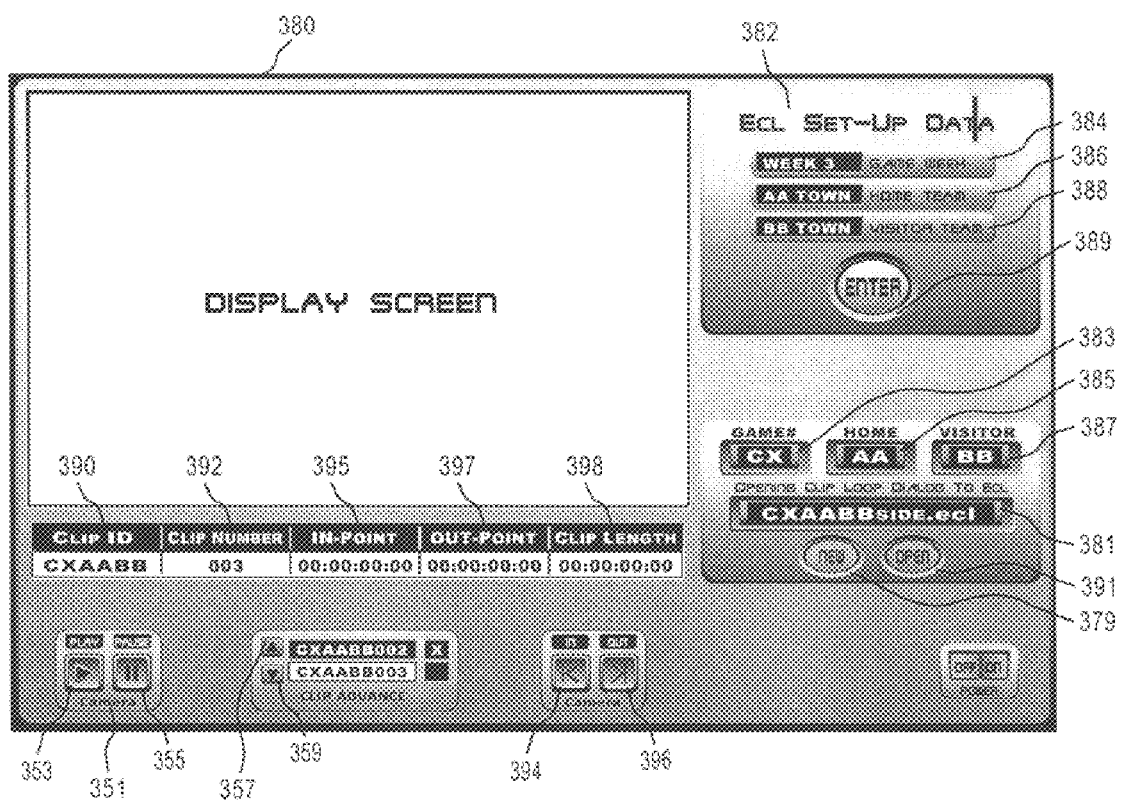
FIG. 7 is a screen display of a BatchEncodingList GUI according to the present invention.

FIG. 7 is a screen display of a BatchEncodingList GUI and enter 389 into the system the according to the present invention. The first encoder plays a videotape track, and identifies a series of consecutive clips within the track. An ECL set-up dialog 382 is used to set up initial ECL batch encoding data. For example, the set-up dialog can include text boxes for the game week 384, home team 386, and visitor team 388.

The software application that is used to generate the ECL automatically assigns sequential clip identification (Clip ID) numbers 390 to each consecutive numbered clip 392. The first encoder then determines the In and Out points that define the beginning and end of each clip, and assigns a file name to each clip.

In the preferred embodiment of the present invention, the Clip ID for a particular clip is assigned according to the attributes of the clip. However, one skilled in the art will recognize that the Clip Ids can also be assigned randomly or using any other assigning convention with which the clips can be indexed, searched, and retrieved according to the teachings of the present invention.

In the preferred embodiment, the first character of the Clip ID represents the current week of game play, using a letter. For example, A=Week 1, and D=Week 4. The next four characters in the Clip ID represent the initials of the teams that are playing in the current clip. The order of these characters establishes which is the Home team and which is the Visiting team. As an illustration, the Home team can be indicated first and the Visiting team can be indicated second, for example, using the designations "AA"=Team 1 and "BB" Team 2.

The software application then automatically logs each clip consecutively, using a play extension. For example, "001"= the first play of a game, and "023"=the twenty-third play of the game. A file extension indicating to the computer operating system the format of the clip file can be appended to the Clip ID. Thus, "mpg" indicates that the file is stored in the Motion Picture Experts Group (MPEG) format.

As an illustration, the clip having the Clip ID "CAABB023.mpg" is the twenty-third play of the third game of the season, between Team 1, playing at home, and visiting Team 2. The clip is stored in MPEG format.

The BatchEncodingList GUI can also include a Clip ID dialog box 381 that permits the first encoder to select 379 and open 391 a selected clip by entering the particular game 383, home team 385, and visitor team 387 information. The second encoder controls the batch encoding process using camera control 353 buttons, such as a play button 351 and a pause button 355. The first encoder can return to a previous clip, or advance to the next consecutive clip by clicking the respective clip advance controls 357, 359.

The invention includes at least one storage device for storing the clips, and database, to be indexed, sorted, and displayed, as well as the software applications required to perform these functions. Such storage device can include a hard disk drive, floppy disk, CD-ROM, digital video disk, laser disk, magnetic tape, video tape, film, or any other computer-accessible storage medium.

The first encoder divides a video tape into consecutive clips according to predetermined criteria. An In point is then identified at the beginning of each clip and is selected by clicking the appropriate button 394. The In point is determined according to consistent, defined criteria. For example, in a video tape of a football game, each play can be designated a separate clip. The In point of each clip can then be arbitrarily selected as, for example, two seconds prior to the snap of the ball in the play referenced in the particular clip.

An Out point is similarly determined for each clip and selected by clicking on the Out button 396. The In and Out points can be selected at any appropriate and consistent times. The In and Out points are used to synchronize clips from different camera angle videotapes. These In and Out points are electronically stored, for example, by storing the In and Out times 395, 397, respectively, in the ECL. The clip length 398 can also be determined and stored.

Figure 8:
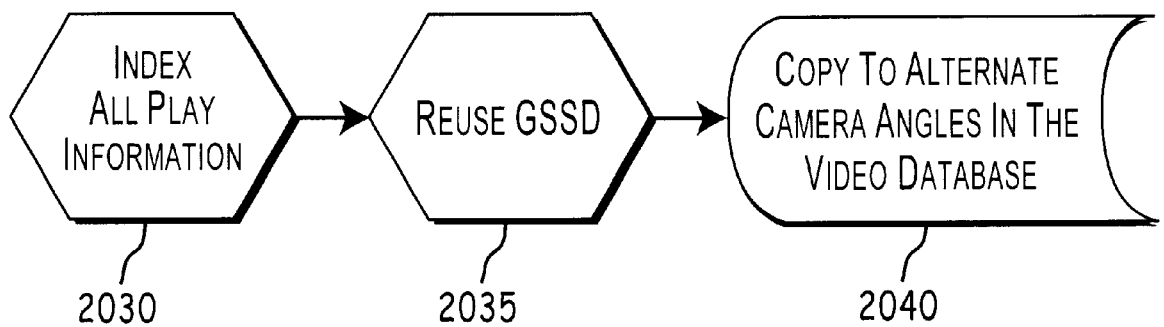
FIG. 8 is a flow chart of a second encoding process according to the present invention.

FIG. 8 is a flow chart of a second encoding process according to the present invention. The primary function of the second encoder is to index all play information (2030). The second encoder also monitors the batch encoding process performed by the first encoder.

Play information includes the game week, playing conditions, game score, home and visitor teams, time of play, down, quarter, yardage, and which team is playing offense. While this information is manually determined and entered into the database by the second encoder in the presently preferred embodiment, the information can alternatively be automatically determined and entered.

For example, in an alternative embodiment of the invention, an intelligent scene detection process is used to detect, recognize, identify, and record motion. The intelligent software agent process can also be used to detect, recognize, identify, and record sounds. Such motion can include scoreboard displays, scene changes, volume levels, and sound textures. The intelligent scene detection process can be implemented using hardware, firmware, or software components.

Various visually displayed items, such as colors, color, time of day, scene types, volume levels and lighting conditions are represented as specific zones of a screen display. An intelligent software agent is then used to scan the video at all times to detect the relationship of each stored item's screen location to that of other items. This relationship can be determined regardless of whether or not the particular stored item is displayed in the currently viewed clip.

Human input is initially used to select, name, and identify the zones in which these visually displayed items are located. Upon receiving initial human input, the intelligent software agent is increasingly, over time, operable to search for and identify the selected items and their relationship to one another.

A name field is attached to items that are identified by the intelligent software agent. These items are then automatically tracked as their appearances and screen locations change from one clip to another. The intelligent agent can continually be self-aligned to track and record multiple sets of information.

The information is automatically captured from the video image and written to a file. This process effectively translates visually displayed data such as scoreboard information, into an instantly accessible text file for the database, or other applications.

Certain items of play information remain constant for each clip in a game. For example, the game week and home/visitor team information or whether the game is being played on natural or artificial turf does not change during a particular game. The invention permits this Game-Specific Setup Data (GSSD) to be entered only once for each ECL file. The GSSD is then automatically reused for each clip in the game (2035). The play information is then copied for each additional video track of a particular game until changed (2040). In the preferred embodiment of the present invention, the Clip ID number is automatically incremented for consecutive clips.

Figure 9:
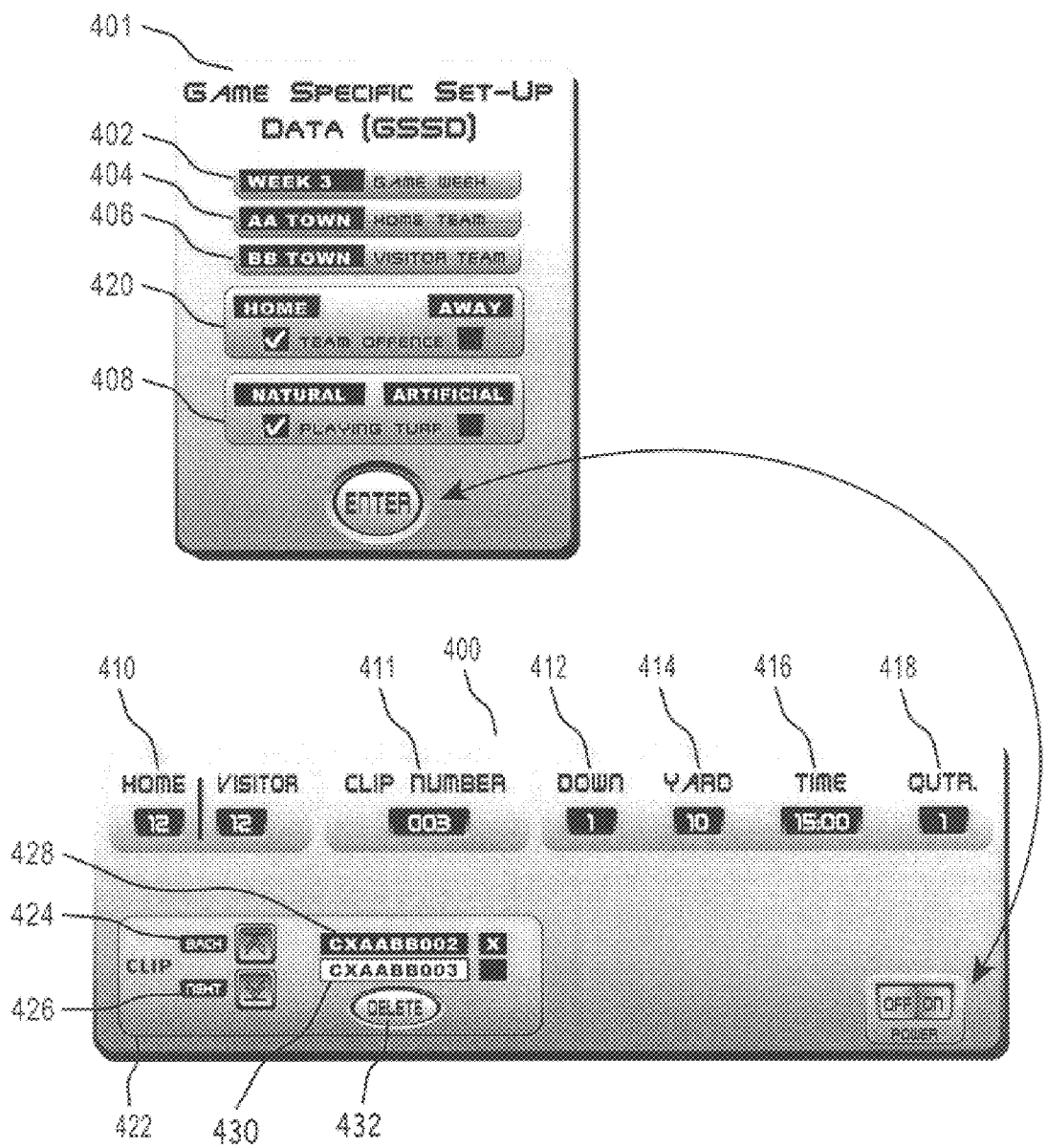
FIG. 9 is a screen display of a second encoder GUI according to the present invention.

FIG. 9 is a screen display of a second encoder GUI 400 according to the present invention. The second encoder first selects an ECL file. The ECL file can be a single master file, or many files which can be distributed across different locations. The ECL file is associated with the file's specific MPEG-encoded video stream. This file contains the previously encoded In and Out points. These In and Out points are used to determine the frame intervals between encoded clips in the selected stream.

An ECL file is the basic element of a central database to which data is entered in other encoding processes. The ECL file includes essential information that is used in generating a clip list for screen viewing based on Clip IDs of selected clips. Such ECL files can also be used to advantage in automating the various encoding processes according to the present invention.

The second encoder enters all GSSD for the selected ECL file into a dialog box 394. The dialog box can be automatically displayed upon selection of an ECL, or can be manually displayed by the second encoder. The GSSD is entered using the Game Week 402, Home Team 404, Visitor Team 406, and Playing Turf 408 buttons of the Game Week setup display. This GSSD information does not need to be reentered, and is automatically logged for each consecutive clip in the ECL file.

In the figure, the GSSD buttons are located at the bottom of the screen. However, the positioning of the buttons is a matter of design convenience only. Therefore, the buttons may optionally be located at any convenient positions on the display. Additionally, the GSSD information may be entered through use of other input means. For example, a drop-down list box, check box, or separate data entry screen(s) may be provided for entry of the GSSD in lieu of buttons.

The second encoder then enters the remaining play information for the clip being encoded. In the preferred embodiment of the present invention, this information can include the clip number 411, score 410, down 412, yard line 414, time remaining 416, quarter 418, and whether the home team is playing offense 420. The clip number is automatically incremented for each consecutive clip in a video tape. An automatic fill-repeat feature transfers redundant score data from clip to clip.

A Clip Control box 422 permits the second encoder to go back 424 to a previous clip, or to go forward 426 to review the next consecutive clip of the video tape. The Clip ID number of the current 430 and the previous 428 or next (not shown) clips can also be displayed. The Clip ID box also includes a delete button 432 to permit the second encoder to delete a clip.

In the preferred embodiment of the present invention, the second encoder monitors the batch encoding process performed by the first encoder. The second encoder manually pauses the frame on the video display deck on any scoreboard shot which occurs prior to the in point of a particular clip. The second encoder then manually enters specific game data, including game score, home and visitor, time of play, down, quarter, yardage, and which team is playing offense for each consecutive clip.

All clips for each camera angle are stored in sequence in the ECL file. For example, the twenty-third clip in CAABB023.mpg for sideline, endzone or any other camera angle will have the same file name in the database. Therefore, all alternative camera angle clips for the same play will store the same play information. Thus, there is no need to monitor and encode play data for every angle that is batch digitized to the, for example, MPEG file format.

The clip for each camera angle will be in a separate part of the directory tree. For example, the sideline and endzone camera angles for the twenty-third clip are stored as:

c:/main_data/sideline/CAABB023.mpg c:/main_data/endzone/CAABB023.mpg

When data has been entered into all of the fields on the display screen, the information is stored to the database. The second encoder GUI then automatically displays the screen for the next consecutive clip in the ECL file. While the second encoder can select any clip for data input, the second encoder cannot bypass an incomplete record by using the Clip Control.

Figure 10:
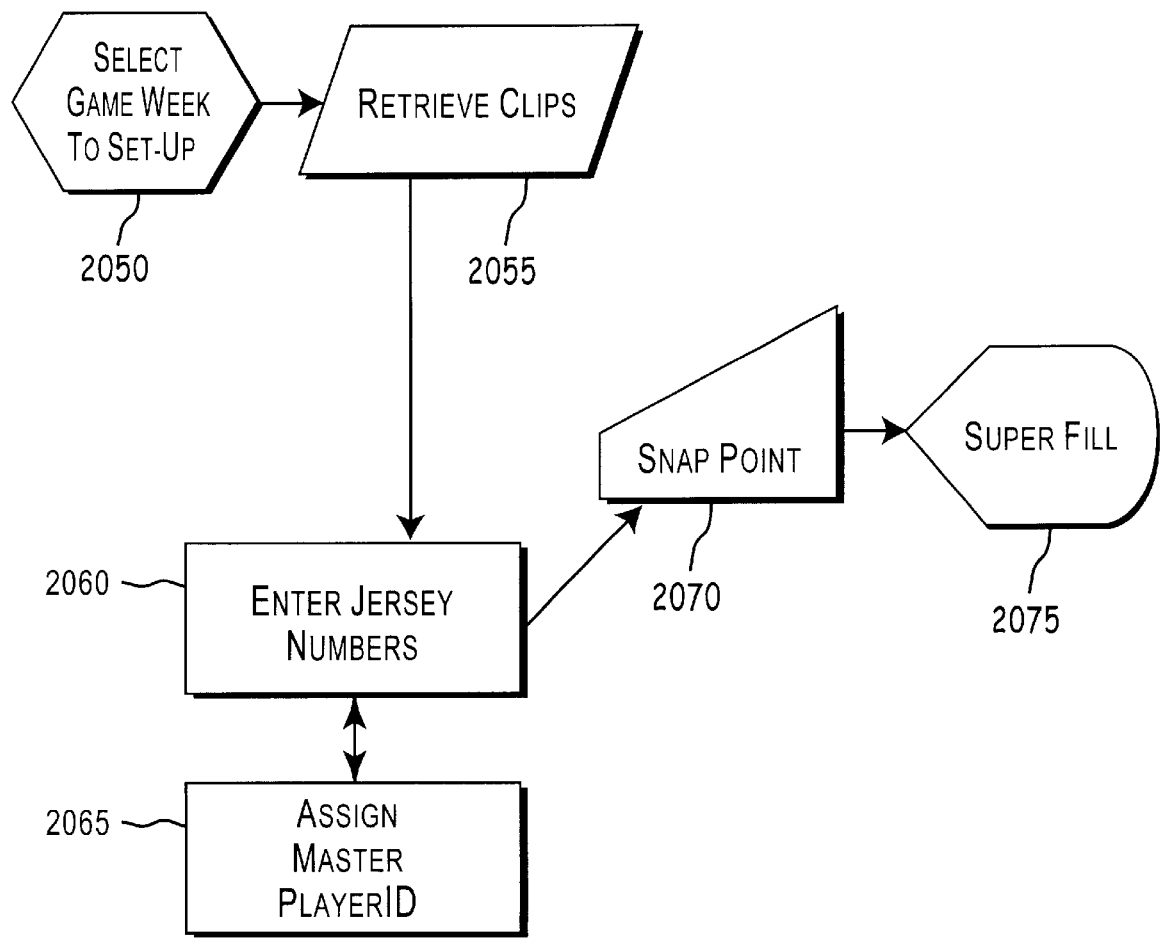
FIG. 10 is a flow chart of a third encoding process according to the present invention.

FIG. 10 is a flow chart of a third encoding process according to the present invention. The third encoder first selects a game week to encode (2050). In response to this selection, all video clips for the selected game are retrieved. The clips are retrieved using file management software application (2055) such as Microsoft Access, produced by Microsoft Corporation of Redmond, Wash.

These clips are cued-up and displayed in the GUI, beginning with the first untracked clip of the game. An untracked clip does not contain any player jersey number data. This feature permits the third encoder to automatically return to the next clip for data entry after having logged-off from the data entry terminal for an extended period of time.

The third encoder then manually enters the jersey numbers of all players in a particular clip (2060). The third encoder obtains this information by viewing the clip and then recording all of the visible numbers. Alternatively, an intelligent software agent, such as previously described with respect to the second encoder process, can be used to obtain and record such information.

A MasterPlayerID is assigned for each player whose relevant information is not stored in the database (2065). The third encoder also identifies and records the snap point of each play (2070). A SuperFill feature then automatically copies all of a previous clip's player data to the next consecutive clip on the same "Point of Attack" (2075).

Figure 11:
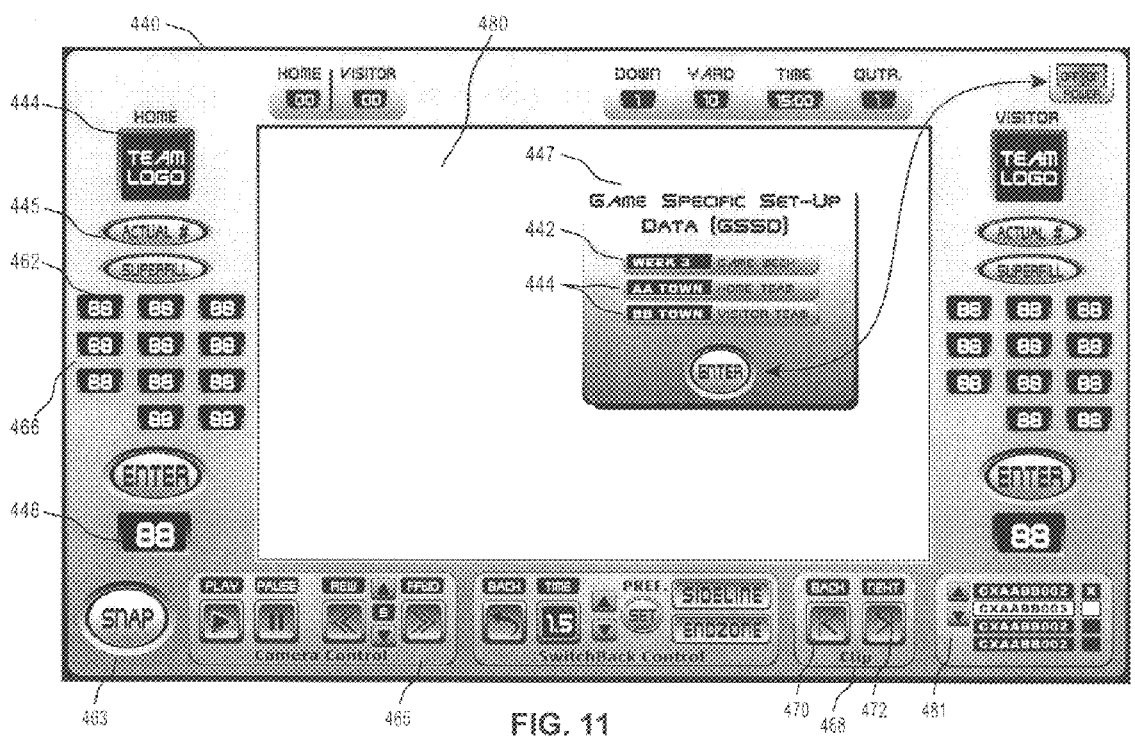
FIG. 11 is a screen display of a tracking sequence GUI according to the present invention.

FIG. 11 is a screen display of a tracking sequence GUI 440 according to the present invention. The third encoder enters the game number in the game text box 442 displayed in the GSSD box 447 to select the game week for encoding. The first untracked clip is automatically displayed in the video screen box 480, and the clip's Clip Id number is displayed in the clip list 481. The Game-Specific Setup Data for the clip is also automatically displayed.

In the preferred embodiment of the present invention, at least the portion of the Clip ID list that includes the currently-displayed clip for the selected game is displayed. The currently displayed clip can be indicated, for example, by highlighting.

While examining each clip, the third encoder manually enters into the player number text box 448 the jersey number for each player on the playing field. As each number is entered 446, it is displayed in a box 462 in a team roster display 466.

The third encoder can also enter into the database data concerning a player's actual location on the video clip display. For example, when entering a jersey number, the third encoder can also enter into the database the selected player's location at the start of the play. In one embodiment of the invention, a circle with crosshairs is used to identify the selected player at the start of the play. This circle disappears when the snap point is determined.

In the preferred embodiment of the present invention, the Home team and the Visitor team each have separate data entry and display boxes, such as the player number text boxes, and player roster displays. However, in alternative embodiments of the present invention, selection means, such as a toggle, can be provided. In such case, a single set of data entry and display boxes can be used to enter and display both Home and Visitor team data.

The invention uses a SuperFill process to automatically copy all of a previous clip's player data to the next consecutive clip on the same "Point of Attack. A Point of Attack is defined as a series of offensive, or defensive, or special teams plays. For example, an offensive drive of five consecutive plays (with no penalties) would be a Point of Attack having five consecutive clips.

The player data from the first clip in a Point of Attack is stored in a temporary file. This temporary file can be stored in a central database, or in a local database accessible only to the third encoder's terminal. The data in this temporary file is automatically reused and displayed to the third encoder when the next consecutive clip in the Point of Attack is displayed. The display screen for this next consecutive clip reflects the presence of such SuperFill data by, for example, by displaying these temporarily stored jersey numbers with a different color background. The temporary file is retained in memory at least until the next consecutive clip is processed.

In the preferred embodiment of the present invention, the SuperFill jersey numbers are "grayed out" (not shown). The third encoder selects the jersey number of each player who remains on the field during this next consecutive clip, for example, by clicking on the grayed out jersey number. This selection can be confirmed by means such as changing the color of the number. In the preferred embodiment of the present invention, a selected grayed out number changes color to yellow to indicate confirmation, and the jersey number information is entered into the database.

The third encoder can then modify this data to reflect any changes that have occurred. For example, if one of eleven football players has been replaced in the next consecutive clip, the third encoder only needs to change the jersey number of the replaced player to that of the new player. This modified information is then stored in the temporary file for use with the next clip in the Point of Attack.

In one embodiment of the present invention, a Point of Attack refers only to the plays of a particular drive or sequence. However, in an alternative embodiment, a Point of Attack refers not only to the plays of a particular drive, but also to the last play of a previous drive or sequence of the same kind. Thus, the jersey number data from a team's last offensive play of a series will be temporarily stored as SuperFill data for use when the team begins its next offensive series. The number of plays in an offensive series can be encoded by any of the first three encoders.

Each player in the database is assigned an identification number, referred to as the player's MasterPlayerID. This MasterPlayerID remains assigned to a player throughout the player's career, and is not changed as the player switches teams. A player who plays at more than one position can be issued a separate MasterPlayerID for each position.

A player's MasterPlayerID is retrieved from the database upon the entry of the player's jersey number. The MasterPlayerId is then used to retrieve player-specific information from the. database. In this process, the player's number, position, and team information are cross-referenced for each clip in which the player is a participant. As an example, in response to the entry of the jersey number "12" for an offensive player, the invention would retrieve information such as:

Team: Anytown, USA
Name: John Athlete
Position: Safety.

An input dialog box (not shown) is generated in response to an entry of apparently inconsistent player-specific information, or an entry of a player name not found in the database. For example, if the number "12" were entered as a wide receiver, the MasterPlayerId of John Athlete is compared with the MasterPlayerIds in the database. An input dialog box (not shown) is then automatically generated by the invention file management software when the MasterPlayerId comparison retrieves the information that player John Athlete is a safety. This input dialog box can display a query to prompt the encoder to verify the inconsistent information, and to enter any corrections thereto. The file management software used by the invention is discussed below in more detail.

The tracking sequence GUI 440 also preferably includes a camera control box 465 and switchback control box. (See previous discussion with respect to FIG. 4*f*).

Upon viewing the input dialog box, the third encoder can then either correct a data entry error, or enter into the database the information that John Athlete is also playing as a safety. A new MasterPlayerId is generated for John Athlete to represent this additional side receiver position. The fifth encoder is also prompted to enter into the database the relevant personal information and statistics of a player whose name is added to the database by the third encoder.

The third encoder determines and marks the location of synchronizing points in each clip. Any clips that display the same play, for example sideline and endzone views of the same play, will have the same Clip ID number. The synchronizing points in each of these clips are used to synchronize the views to permit a user to switch the displayed views in real time.

These synchronization points are selected according to predetermined criteria. In the football embodiment discussed herein, the snap point is designated the official start of a play. It is readily apparent that, for each alternative embodiment of the present invention, a different start point, such as the dropping of a puck, or the starting of a game clock, may be selected.

The third encoder sets the start of a play by marking the snap point by, for example, clicking the snap point button 463 at the appropriate time. While in the presently preferred embodiment the snap point is determined visually and manually marked by the third encoder, in alternative embodiments of the present invention, the snap point can be automatically determined and entered into the database, for example, using an intelligent software application.

The snap point time is linked to the Clip ID number and is recorded in the database for each video clip for both the sideline and endzone camera angle clips. In the preferred embodiment of the present invention, the snap point is stored as a time-based list, and is not marked onto the video clips. The third encoder can then use the linked snap points to verify that clips having the same Clip ID do, in fact, show the same play in the game.

When the player entry for a particular clip is completed, the third encoder proceeds to the next consecutive clip. A Clip Control box 468 includes controls to permit the third encoder to go back 470 to a previous clip, or forward 472 to the next clip.

The third encoder cannot proceed to encode the next consecutive clip until all player jersey numbers have been entered and until both sideline and endzone snap points have been recorded. An error dialog box (not shown) is displayed if the third encoder attempts to proceed to the next consecutive clip without having first entered this data.

Figure 12:
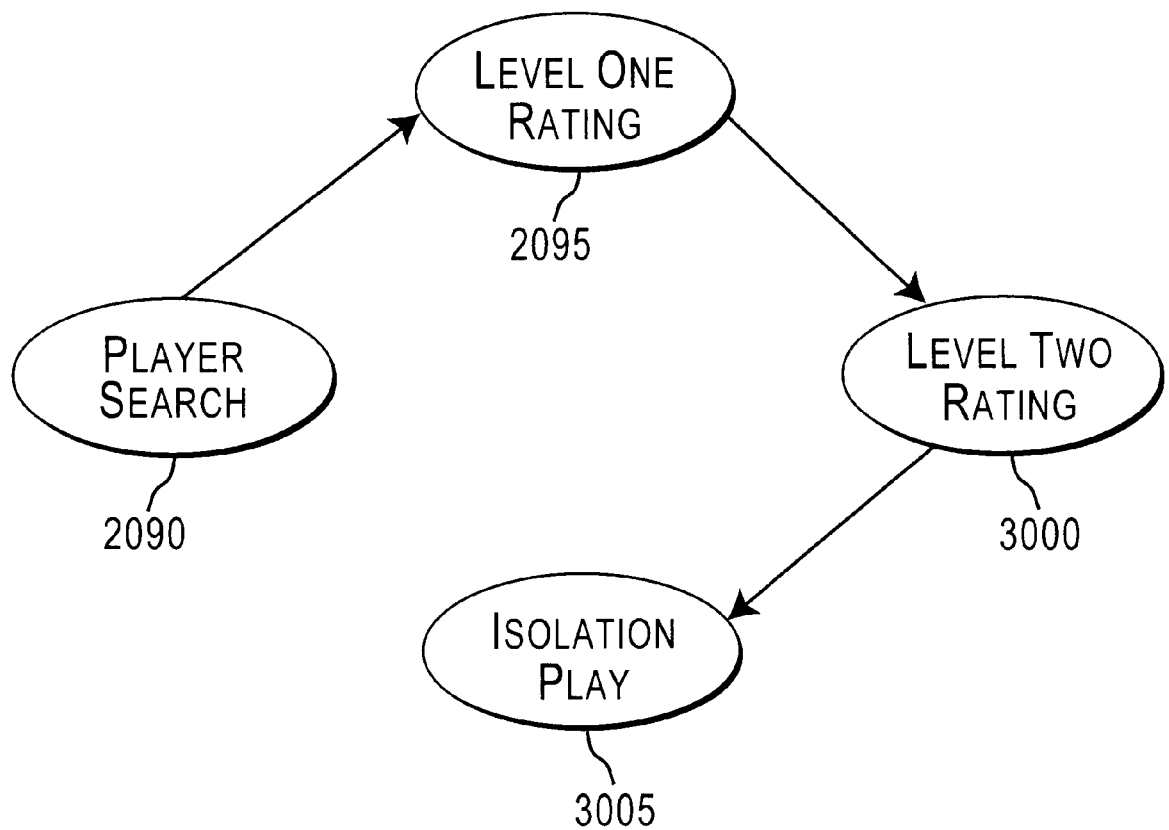
FIG. 12 is a flow chart of a fourth encoding process according to the present invention.

Clip evaluation and custom player ratings are assigned in a fourth encoding process. FIG. 12 is a flow chart of a fourth encoding process according to the present invention. The fourth encoder first searches in the database for a particular player who participates in a clip (2090).

The fourth encoder evaluates the selected player performance and assigns the player a Level One rating (2095). Each player participating in the clip is similarly evaluated. The fourth encoder then evaluates the clip itself and assigns the clip a Level Two rating (3000). The fourth encoder also sets the in and out points that designate Isolation Plays (3005).

Figure 13:
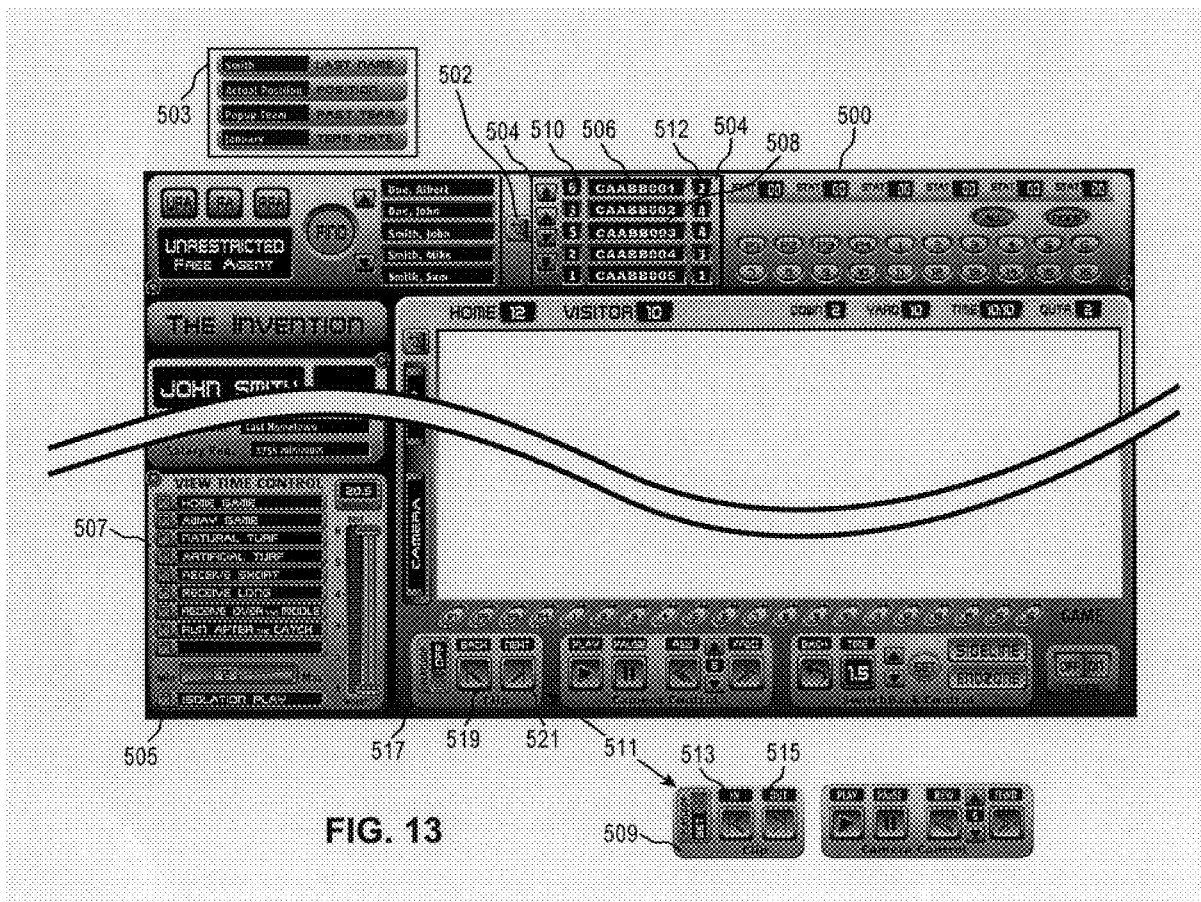
FIG. 13 is a screen display of a clip evaluation GUI according to the present invention.

FIG. 13 is a screen display of a clip evaluation GUI 500 according to the present invention. The clip evaluation GUI used by the fourth encoder is similar to the End-User GUI, shown in FIG. 4a. However, in addition to the features of the End-User GUI, the fourth encoder is also provided with means to conduct player searches based upon different criteria, and means to enter data into the system database. The Figure is therefore discussed with regard to these additional features.

The clip evaluation GUI includes means for toggling between a player search criteria mode, and a rating structure criteria mode. This toggling means can be, for example, a toggle switch 502 or a selectable button on the display screen.

Upon selection of the player search criteria mode, a player search selection box 503 is displayed. The selection box permits the fourth encoder to search the database for information and video clips selected according to such searchable criteria as name, position, past team, or termination date. The selection box has been previously described in detail with respect to FIG. 4b.

A Level One Rating is then assigned by the fourth encoder. The fourth encoder assigns this Level One Rating by reviewing each consecutive play (clip) of a video tape using a predefined set of ratings criteria. These criteria can be adopted from, for example, recognized governmental or organizational standards, or can be independently developed by the end-user of the present invention or by an information or rating service provider using the invention. Thus, the scoring conventions currently used by the international governing bodies of gymnastics or diving can be adopted for use with the present invention.

The presently preferred embodiment of the invention uses a bell-curve rating system having rating numbers between one (for the "worst" play) and six (for the "best" play). The Level One Rating determines a player's "best and worst" plays for use by the View Time Control (VTC), as described above, with respect to FIG. 4. This rating can be determined by the fourth encoder, or by another person, such as a trained scout, for use by the fourth encoder.

To enter this rating into the database, the fourth encoder toggles from the player search criteria mode to the rating structure criteria mode. A rating box 504 is then displayed in the GUI. In the preferred embodiment of the present invention, the rating box displays a list of consecutive clips 506, including the currently-selected clip 508. The currently-selected clip is indicated by such means as highlighting. The fourth encoder can then enter the Level One rating into the appropriate text entry box 510.

The fourth encoder also assigns a Level Two rating to each clip. The fourth encoder can then enter the Level Two rating into the appropriate text entry box 512. The Level Two rating established the viewing priority of the clip, as controlled by the VTC. For example, each clip can be rated using a Level Two rating system having rating numbers of from one two four. The end-user can then select for viewing clips having a particular rating number. Thus, clips rated one would always be shown, while clips rated two through four would only be shown if user-selected.

The View Time Control enables the viewing criteria to be parsed according to multiple criteria. These criteria can include user-configured or encoder-configured features, or Custom Isolation Play Sets (described in detail below). The present invention displays different VTC parameters in response to the playing position of a selected player. The fourth encoder determines whether each of the displayed parameters is true or false. However, any displayed GSSD parameters cannot be so marked by the fourth encoder, because this information has already been entered by a previous encoding process.

Examples of parameters for football player positions include, but are not limited to:

For Receivers and Tight Ends—
  Receive Short
  Receive Long
  Run After the Catch For Offensive Tackles—
  Pass Block
  Run Block For Running Backs and Full Backs—
  Inside Run
  Outside Run
  Blocking
  Receiving
  100 Yard Plus Games For Defensive Ends and Defensive Tackles—
  Pass Rush
  Run At
  Runaway For Linebackers—
  Blitz
  Coverage—Man
  Coverage—Zone
  Run At
  Run Away For Defensive Centers and Defensive Safeties—
  Run Support
  Coverage—Man
  Coverage—Zone The fourth encoder also sets the in and out points that designate Isolation Plays. An Isolation Play is a subset of a clip that includes the highlight of that clip. The fourth encoder sets the Isolation Play In and Out points according to a predefined set of parameters that determine which events qualify for Isolation Play status, and how many seconds are to be allocated before and after the Isolation Play.

Different levels and distinct applications can be defined for the IsolationPlays, permitting an end-user to quickly locate and play specific sets of video clips. One example of an Isolation Play is a catch by a receiver, and several seconds before and after the catch. An end-user can therefore select and retrieve for display, for example, all IsolationPlays showing the catches of a particular receiver.

To set an Isolation Play, the fourth encoder selects the Isolation Play button 505 in the VTC box 507 of the display screen. In response to this selection, the Play Loop switch 517 in the Clip Control box 511 of the display is replaced with the Isolation Play switch 509, thereby indicating that Isolation Play is active. When Isolation Play is active, In and Out buttons 513, 515, respectively, are displayed. The fourth encoder clicks on the appropriate button during display of the clip to set the In and Out points, respectively.

Clicking the Isolation Play switch again toggles the Clip Control back to the Play Loop switch. When the Play Loop switch is active, Back and Next buttons 519, 521, respectively, are displayed, to permit the fourth encoder to view the previous or the next consecutive clip. The Clip Control has previously been discussed with respect to FIG. 4f.

Figure 14:
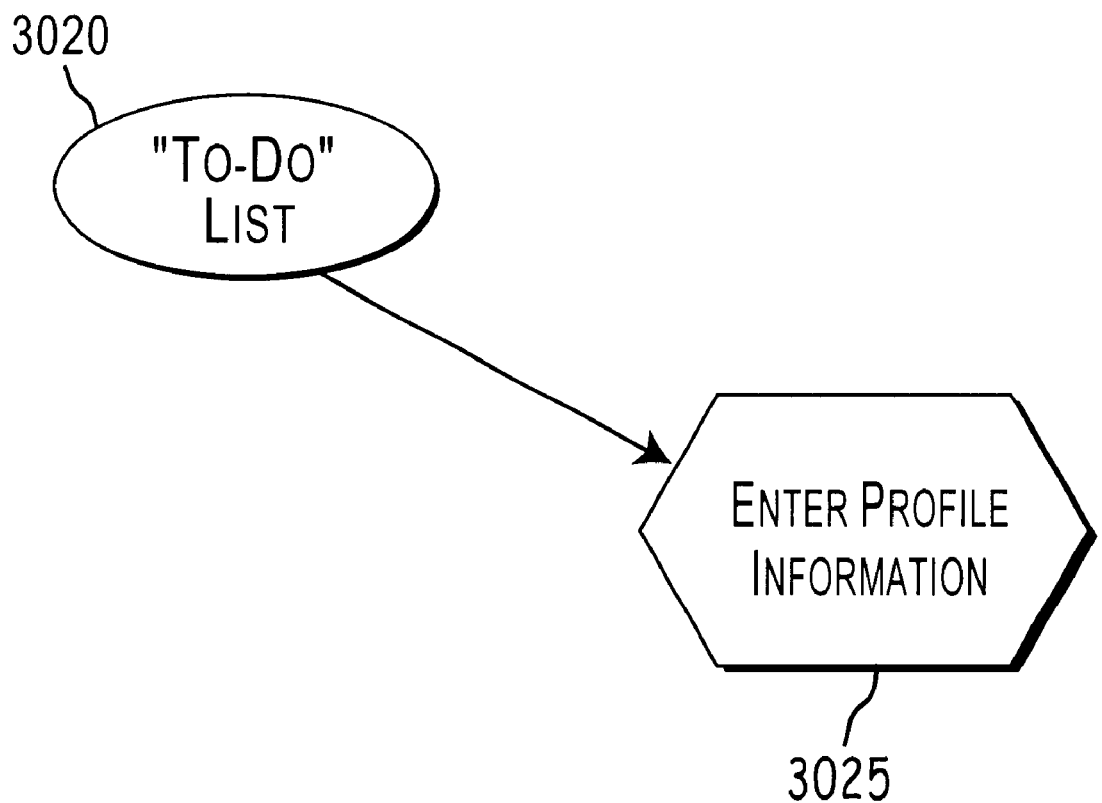
FIG. 14 is a flow chart of a fifth encoding process according to the present invention.

Upon completion of the fourth encoding process, the database is updated using a fifth encoding process. FIG. 14 is a flow chart of a fifth encoding process according to the present invention. In this fifth encoding process, the fifth encoder is presented with a "to do" list of data entry fields, reflecting missing statistical information (3020). The fifth encoder enters this missing statistical information. The database is thereby updated with data such as team statistics, player personal statistics, player injuries, information sources, as well as other specific data. The fifth encoder also monitors and enters player profile information (3025).

Additionally, in the fifth encoding process, player jersey numbers which are not found in the database roster are noted in an automatic data error checking system. In this data checking system, fifth encoder is prompted to enter specific player information such as name, position, and MasterPlayerID. The assigning of a new MasterPlayerID to a player has been discussed in detail with respect to the third encoding process as illustrated by FIG. 11.

Figure 15:
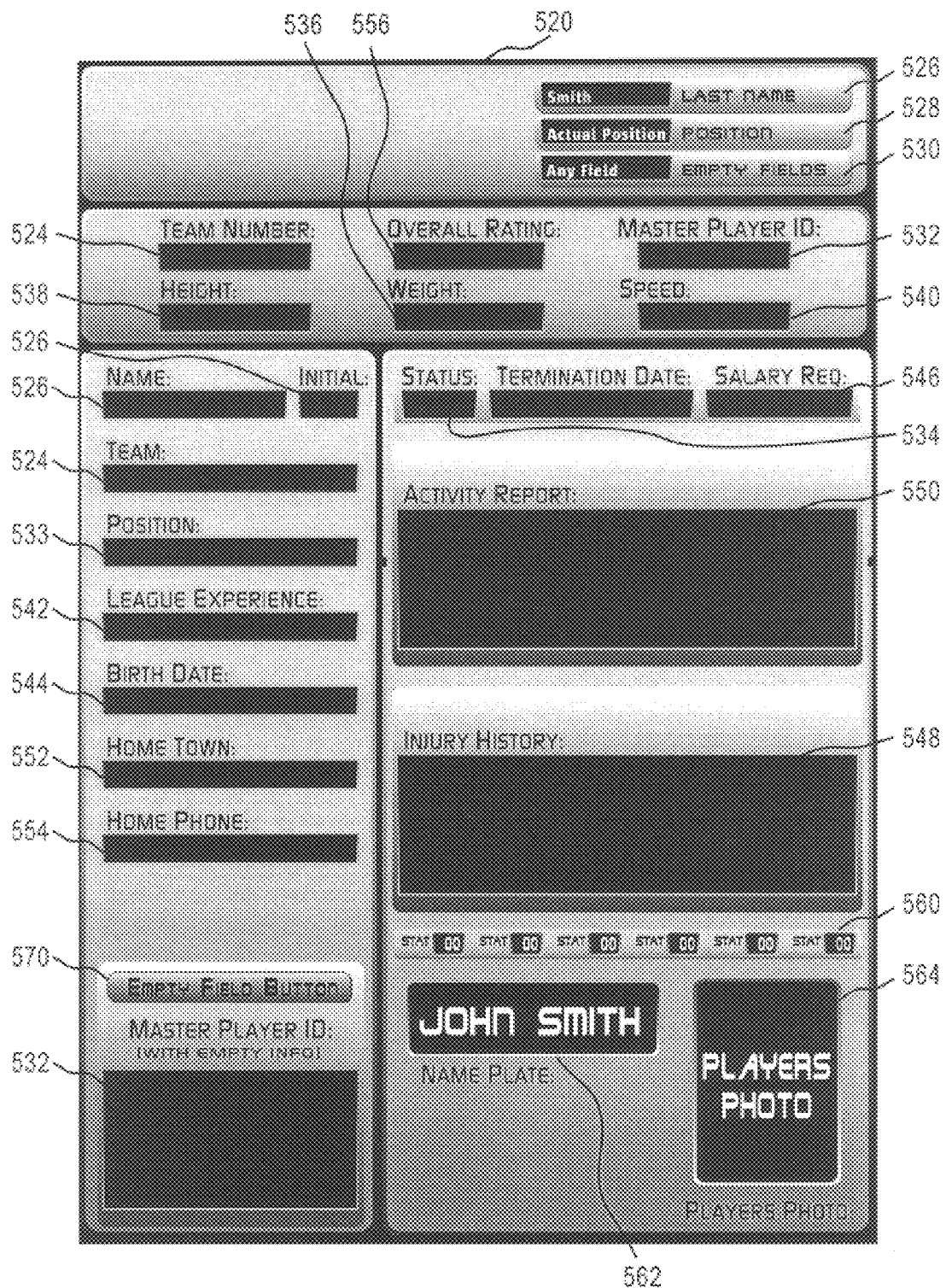
FIG. 15 is a screen display of a database update GUI according to the present invention.

FIG. 15 is a screen display of a database update GUI 520 according to the present invention. A list of all players with missing statistical information is brought up in a queue (not shown) for review by the fifth encoder. This queue is presented as a "to do" list of data entry fields, for example, for new player jersey numbers that were previously logged in the encoder level three process, but which were previously not in the system.

In the preferred embodiment, an empty field button 570 is provided. The fifth encoder first clicks on the empty field button and then selects any other field to locate and display all empty data fields in the database for the selected field. For example, all players whose home town data fields are empty are displayed upon clicking the empty field button and then selecting the home town field.

The fifth encoder can verify previously-entered information and enter new information into these fields. If there are no players listed in the "to do" list, then the fifth encoder can search for players by name 526, position 528, or for specific fields 530. In the preferred embodiment of the present invention, the database update GUI includes, but is not limited to, data entry fields for team number 524, player name 526, and MasterPlayerId 532.

The statistical information database stores profile information for each player. The fifth encoder monitors and edits this information. Player profile information can include, but is not limited to position 533, status 534, age (not shown), weight 536, height 538, speed 540, experience 542, college (not shown), date of birth 544, agent (not shown), last team (not shown), salary requirements 546, injury history 548, home town 552, home phone 554, overall rating 556, and intra-league activity reports 550. The players statistics (Statistics) 560, name plate 562, and photo 564 can also be displayed.

In the preferred embodiment of the present invention, the specific statistical data that can be entered into the statistical information database includes:

Rushing Statistics for Full-Backs and Half-Backs
  Number of Rushes
  Yards Rushing
  Average
  Touchdowns
Passing Statistics for Quarterbacks
  Attempted
  Completed
  Yardage
  Completion %
  Touchdowns
  Interceptions Receiving Statistics for all Receivers (not shown)
  Number of Catches
  Yards
  Touchdowns
  Number of Drops (This statistic is preferably entered for each player's clip by the fourth encoder.)
Defensive Statistics (not shown)
  Number of Sacks
  Total Number of Tackles
  Number of Interceptions
  Number of Touchdowns.

The fifth encoder can also enter a player overall rating into the database. This overall rating can be determined from the average of the individual player's ratings for each play in which the player participated.

Figure 16:
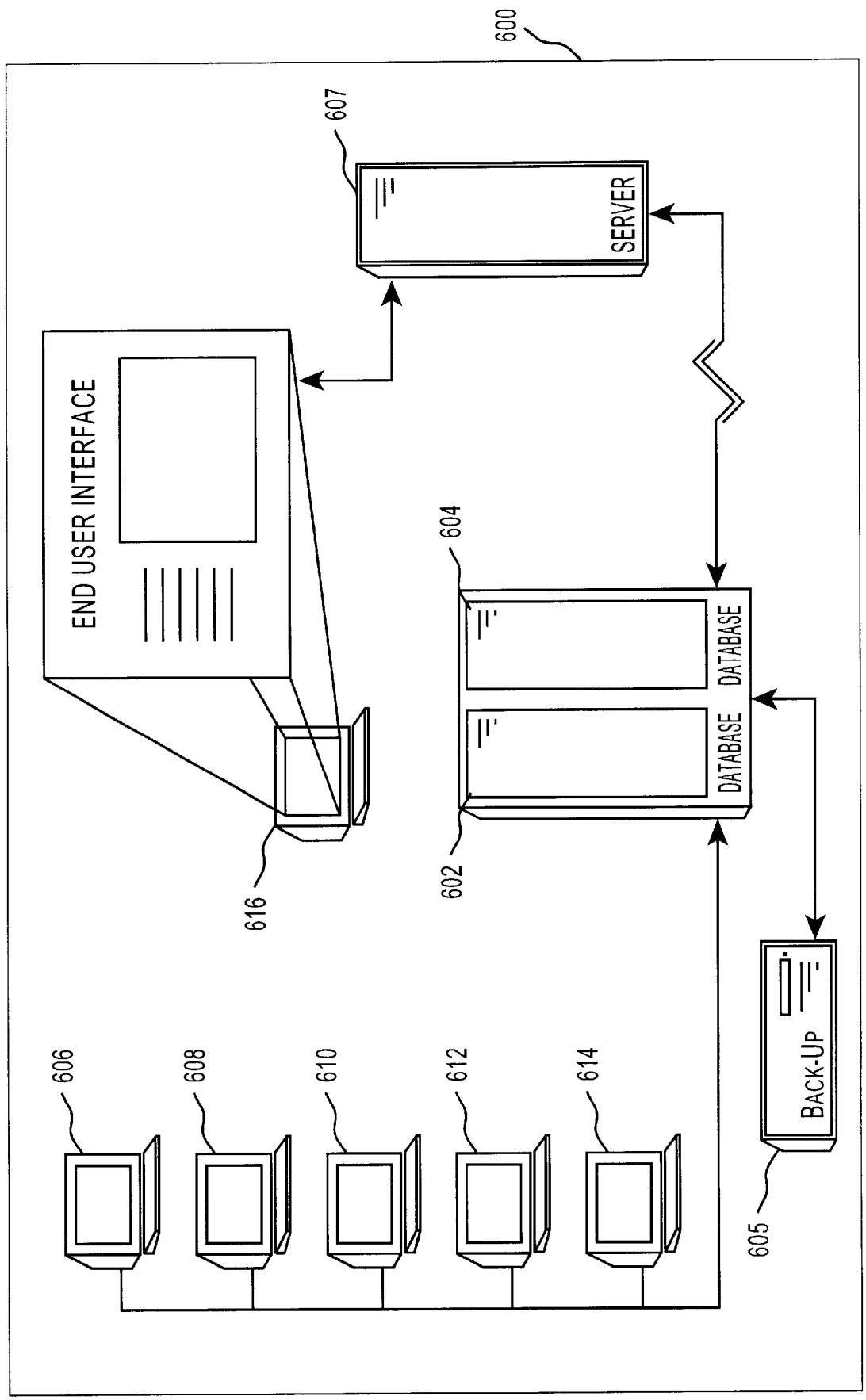
FIG. 16 is a system diagram of a system for indexing, sorting, and displaying a video database according to the present invention.

FIG. 16 is a system diagram of a system 600 for indexing, sorting, and displaying a video database according to the present invention. In the preferred embodiment of the present invention, two separate statistical information databases 602, 604 are maintained by verification encoders. A first database 602 stores the most recently available player information. The second database 604 includes, for display in an encoder process 606, 608, 610, 612, 614 or End-User GUI 616, the previously-available player information. When a request for display of data is made for data stored in the second database, a check of the first database is also performed to determine whether more current information is available. Both databases are preferably updated 605 on a periodic basis. These updates can be performed by either a human encoder, or automatically by a computer.

The present invention can be implemented on any suitable computer hardware configuration. The preferred embodiment uses a server-based 607 electronic network using, for example, a PC-based computer running Microsoft SQL Server. A file management software application such as Microsoft Access is used to generate, organize, and access any or all of the databases.

In the preferred embodiment of the present invention, the hardware configuration includes 100 MB fiber channel network connections, two Terabyte servers, and features a 5 MB per second data transfer rate. However, the invention can also be implemented using any other computer configuration, including an intranet system, Internet system, satellite communication system, personal computer-based system, broadcast network, or server-based network system. For example, the invention can be provided as subscription service transmitted by satellite to a subscriber.

The invention can be distributed on a storage medium, such as on a hard drive, or removable storage cartridge. The user can then access the database stored on the storage medium. Upgrades to the database can then be distributed to the User. Alternatively, the invention can be provided as an on-demand service, with the database being stored in the service provider's storage medium. The information can then be distributed to the User as requested, using such means as the Internet, cable, fiber optics, or satellite transmission.

Figure 17:
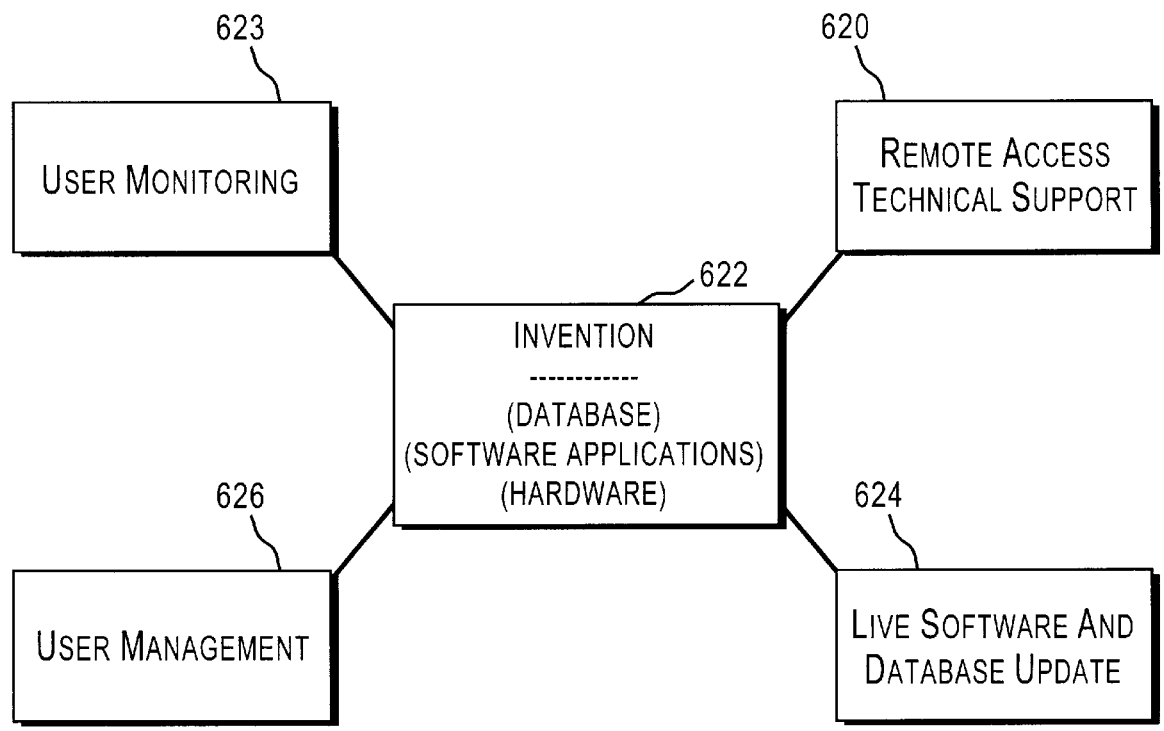
FIG. 17 is a system diagram of the security and administration architecture according to the present invention.

FIG. 17 is a system diagram of the security and administration architecture according to the present invention. The security and administration protocols are used in accessing the database, as well as in storing and assigning data thereto. Tasks subject to the security and administrative protocol include software management and updating, technical support and assigning, issuing and verifying passwords. The security and administration protocols are also used to monitor application use, including the location, time of use, information displayed, and password used.

Any or all features of the security and administration architecture according to the present invention can be provided with multiple levels of access based upon security priority and password status. The features supported by the security and administration architecture are enabled by any appropriate software applications and hardware components.

In the remote access technical support feature 620, the technical support personnel can use any digital transfer communication method to directly access the invention hardware, software applications or database 622. The technical support personnel can thereby diagnose, develop, test, update, monitor, or correct system problems. User queries can also be answered in real time. The technical support personnel can also use this feature to view the same display as is currently viewed by an encoder or User.

The live software and database update feature 624 permits remote access to information stored in any database or available to any display terminal of the system according to the present invention. Data and software can thereby be monitored, reorganized, updated, and removed.

The user management feature 626 is used to remotely monitor password use. This feature can be used to monitor compliance with software or other licensing agreements. The user management monitoring can be performed on-site or remotely using any supported communication means.

The user monitoring feature 628 is operable to track each encoder and User's use of the system. This feature can be used to determine the length of time that an encoder or user accessed any component area of the invention, and can provide administrative, marketing, field, player, and rating data. The user monitoring feature is used to advantage in maintaining process quality control and in enabling process improvements. The user monitoring feature can be performed on-site or remotely using any supported communication means.

In the preferred embodiment of the present invention, the data associated with one season of play is stored in a single database file. Such data includes player statistics and data associated with the video clips.

An exemplary database structure is shown in Appendix "C". In the exemplary database structure, a Player Master table stores the players' MasterPlayerIds and other related personal information such as name, or date of birth. The MasterPlayerId of a selected player is used as a pointer to information stored in a Player Current table. The Player Master table, in conjunction with the Player Current table, is used to manage the flow of data within the database.

The Player Current table is used to store current relevant player information that can periodically change. Such information includes team name, or jersey number. Information retrieved from the Player Current table in response to the selection of a player is displayed in the Player Information box. (See FIG. 4c, above). This player information is accessed initially when a video clip is being played.

In a Player and Play table, a player's MasterPlayerId, stored in the Player Master table, is used, in conjunction with the Player Current table, to generate a response to a query from a user. The player's rating is stored to the Player and Play table. This rating can be used to determine which video clips are retrieved for display in response to a search request.

A Clip Master table can be used to store the information entered into the database in the second encoding process, such as the Clip Ids and clip length information. A list generated in response to a query to the Clip Master table provides the location of data provided in response to any changes in the total amount of viewing time currently selected in the View Time Control. The Clip Master table is also used to provide the location of the series of clips queued for viewing.

A Player Statistic table is used to store and maintain any statistical information. More than one set of statistics can be stored per table record. For example, statistical information can be stored according to week, game, play, or according to any other set of sortable criteria.

A Position Codes table can be provided as a reference library. This library is queried to test and verify data entered into the system. This table is used to provide quality control for data entered into or output from the system, as well as to promote consistent data and data formats.

In alternative embodiments of the present invention, the video and informational data can be stored to a database according to any appropriate database storage configuration. Such configurations can include separate files, separate databases, local and remote locations, server setup, and partitions.

The present invention also uses a multimedia authoring software application such as Macromedia Director to control the media elements, such as the video tape. The multimedia authoring software application is used to import graphics or video. The graphics or video are then interactively integrated and synchronized with the information databases.

The preferred embodiment of the present invention is adapted for use by sports professionals such as scouts, managers, players, coaches, officials, and sports journalists. However, the invention can be readily be adapted for use by any other user, such as a researcher or fan.

One skilled in the art will recognize that the teachings of the present invention are also readily adapted for use with any sport, or with non-sports uses. For example, a database according to the present invention can store clips of movie, theater, and musical performances, such as for use by talent agents, or political speeches and records of votes for use by political analysts. The present invention can also be used to index, sort, and display other types of media elements, including audio, audio tracks associated with video tape, and film.

While, in the preferred embodiment of the present invention, rating information is entered into the database as part of an encoder process, in an alternative embodiment, this rating information is not included in the database as an encoder process. An information or rating service provider can then use the invention to provide a customized rating system or evaluation of individual players or teams based upon the statistics stored in the invention databases.

The invention can be implemented with any appropriate data entry and data output, including keyboard, touch screen, voice recognition, pointer device such as trackball, touchpad, wand, mouse, handwriting recognition, audio input and output, and touch-sensitive screen. In addition, the graphical user interfaces of the present invention can use different data entry and input means including, but not limited to a button, dialog box, slider bar, keyboard input, touch screen, and voice recognition. Selected buttons or other elements can be indicated by means such as highlighting, changing color, changing size, changing position on display, or changing font.

The graphical user interfaces shown in the Figures are exemplary only, and are not intended to limit the scope of the present invention in any way. The present invention can be implemented using any suitable graphical user interface configuration. For example, any button, toggle or other data entry or input means can be positioned at any point on the screen. In one embodiment of the present invention, any or all of the graphical user interfaces are user-configurable. Alternatively, any or all of the graphical user interfaces can be configurable by manufacturer according to user specifications, or not configurable.

In the preferred embodiment of the present invention, at least the User is provided with a Preferences GUI to set and save GUI display preferences. However, in alternative embodiments, each process level GUI can be provided with a preferences GUI. Thus, any or all of the encoders can configure the appearance and any or all of the options displayed in the encoder's specific GUI.

Advertising or logo(s) can optionally be displayed on any or all of the GUIs. This advertising or logo can include animation, sound, text, or graphics. Password protection is required to access the encoder process and End-User GUIs in the preferred embodiment of the present invention. However, in alternative embodiments, such password protection can be optional at any or all process levels.

While the preferred embodiment of the present invention is described herein in reference to the use of two cameras, the endzone and the sideline cameras, one skilled in the art will readily appreciate that any number of cameras and camera angles can be used. Furthermore, any number of cameras, video tracks or audio tracks can be synchronized to the original video clips encoded according to the teachings of the invention. For example, a sound track can be synchronized with the video clips.

Additionally, there is no requirement that there be a synchronized clip for any or all of the video clips processed according to the invention. Thus, one or more video clips can be indexed, sorted, and displayed without the existence of a second synchronized clip. As an example, the teachings of the present invention can be applied to a football game that is videotaped, at least in part, by only one camera.

A zoom feature for any or all of the process levels. Thus, for example, all of the encoders and the User can zoom in to enlarge the video display of a clip, and zoom out to view a wide-angle display.

Any or all of the GUIs of the present invention can be provided with an expandable toolbar. Therefore, new tools and features can be added to the GUIs. For example, search features that permit the User to search for video clips according to turf, weather, or day/night can be added to the appropriate User and encoder GUIs.

The present invention is readily implemented using well known hardware components. In addition, the software applications required to implement the invention can be readily devised by one of skill in the art using well-known programming techniques.

The preferred embodiment of the present invention is implemented using the MPEG-2 format for the video clips. However, any other appropriate video format may also be used. The MPEG-2 format can be supported by a hardware component such as a hardware-based MPEG-2 decoder card. However, the invention can also be readily implemented using software or firmware support for the MPEG-2 format video.

Those of ordinary skill in the art will recognize that variations which embody the spirit of the present invention are possible and are intended to be included within the scope of the amended claims.

What is claimed is:

1. A computer-implemented method for indexing, sorting, searching and displaying a database, comprising the steps of:

a. creating a searchable computer database structure for storing video and informational data;

b. determining the discrete component clips of at least one video record such that each clip represents a predetermined event;

c. assigning an identification number to each clip such that all clips showing the same event have same clip identification number;

d. determining the beginning and ending points of each clip;

e. storing to the database structure the determination of the discrete component clips, the identification number, and the beginning and ending points of steps b through d;

f. identifying at least one person appearing in at least one of the discrete component clips;

g. storing the identification information of step f to the database structure;

h. assigning a personal identification number to each person identified in step f;

i. storing the personal identification number to the database structure;

j. storing selected information to the database structure about at least the identified person such that the selected information is indexed to the identified person's personal identification number wherein the stored selected information includes a rating of the identified person's performance as shown in at least one of the clips, and includes an editorial view priority;

k. using the personal identification number and the clip identification numbers to index the informational database to the component video clips;

l. displaying a view time control box, said view time control box comprising a first sliding bar with a minimum-maximum time range for selecting the total number of minutes of video clip footage which the user desires to view, as determined by the editorial view priority, a second sliding bar with a range of best to worst for selecting the quality of plays of a person in a video clip which the viewer desires to view, a separate window for displaying the total number of minutes selected by the first sliding bar, searching for video clips based on the positions of the first sliding bar, and the second sliding bar.

2. The method of claim 1, further comprising the steps of:

identifying a plurality of video clips having the same clip identification number; and synchronizing the beginning and ending points of the identified video clips; wherein a display of an identified video clip can be switched in real time to a display of any other identified video clip having the same identification number.

3. The method of claim 1, wherein the informational database includes any information to be indexed to any discrete component clip in at least one video record.

4. The method of claim 3, wherein the information in the informational database includes audio, graphical, and textual information.

5. The method of claim 1, further comprising the steps of:

providing a predefined rating structure; and using the predefined rating structure to assign a rating to any of a video record, video clip, performance of at least one person appearing in a video clips, or overall performance of at least one person appearing in a plurality of video clips.

6. The method of claim 1, further including the step of displaying any video clip and associated indexed information retrieved from the database structure in response to a input user-defined search criteria on a dedicated console.

7. The method of claim 1, further comprising the step of providing at least one computer graphical user interface for performing any or all of steps a through I.

8. The method of claim 1, further comprising the step of controlling the display of the video clip at a selected frame interval to permit a slow motion display of the video clip.

9. The method of claim 1, wherein the view time control box further includes a plurality of search selection boxes, wherein a user can select and deselect videotape clips to be searched.

* * * * *

UNITED STATES PATENT AND TRADEMARK OFFICE
CERTIFICATE OF CORRECTION

PATENT NO. : 6,631,522 B1  Page 1 of 1
DATED : October 7, 2003
INVENTOR(S) : David Erdelyi It is certified that error appears in the above-identified patent and that said Letters Patent is hereby corrected as shown below:

Title page,
Item [57], ABSTRACT,
Line 18, delete "." after the word "form".

Column 26,
Line 36, change "I" to -- 1 --.
Line 53, the sentence "wherein a display of an identified video clip can be switched in real time to a display of any other identified video clip having the same identification number." should be a separate paragraph.

Column 27,
Line 9, change "I" to -- 1 --.

Signed and Sealed this

Ninth Day of December, 2003

JAMES E. ROGAN
*Director of the United States Patent and Trademark Office*